US011904608B2

(12) United States Patent
Nozawa et al.

(10) Patent No.: US 11,904,608 B2
(45) Date of Patent: Feb. 20, 2024

(54) LIQUID DISCHARGE APPARATUS

(71) Applicant: SEIKO EPSON CORPORATION, Tokyo (JP)

(72) Inventors: Dai Nozawa, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

(21) Appl. No.: 17/649,087

(22) Filed: Jan. 27, 2022

(65) Prior Publication Data

US 2022/0242112 A1 Aug. 4, 2022

(30) Foreign Application Priority Data

Jan. 29, 2021 (JP) ................................. 2021-013532

(51) Int. Cl.
*B41J 2/045* (2006.01)

(52) U.S. Cl.
CPC ......... *B41J 2/04541* (2013.01); *B41J 2/0455* (2013.01); *B41J 2/04581* (2013.01); *B41J 2/04588* (2013.01)

(58) Field of Classification Search
CPC .. B41J 2/0455; B41J 2/04541; B41J 2/04543; B41J 2/04581; B41J 2/04588; B81B 1/00; B81B 7/0006; B81B 3/0021; B81B 2201/05; B81B 2203/0338; B81C 1/00071; B81C 1/00119; G11C 16/10; G11C 16/26
See application file for complete search history.

(56) References Cited

U.S. PATENT DOCUMENTS

2008/0018687 A1* 1/2008 Tabata ................. B41J 2/04541 347/11
2009/0140780 A1* 6/2009 Miyazaki ................. H03K 7/08 327/112
2015/0246530 A1 9/2015 Abe et al.

FOREIGN PATENT DOCUMENTS

JP 2015-164779 A 9/2015

* cited by examiner

*Primary Examiner* — Thinh H Nguyen
(74) *Attorney, Agent, or Firm* — Global IP Counselors, LLP

(57) ABSTRACT

There is provided a liquid discharge apparatus includes a first transistor in which a second terminal and a third terminal are electrically coupled to according to a first terminal, a second transistor in which a fifth terminal and a sixth terminal are electrically coupled to according to a fourth terminal, and a coil that has one end electrically coupled to the second terminal and the sixth terminal, and the other end electrically coupled to the discharge head, a shortest distance between the second terminal and the one end of the coil is shorter than that between the third terminal and the one end of the coil, a shortest distance between the sixth terminal and the one end of the coil is shorter than that between the fifth terminal and the one end of the coil.

11 Claims, 10 Drawing Sheets

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

LIQUID DISCHARGE APPARATUS

The present application is based on, and claims priority from JP Application Serial Number 2021-013532, filed Jan. 29, 2021, the disclosure of which is hereby incorporated by reference herein in its entirety.

BACKGROUND

1. Technical Field

The present disclosure relates to a liquid discharge apparatus.

2. Related Art

As an ink jet printer that prints an image or a document on a medium by discharging ink as a liquid, for example, the one using a piezoelectric element is known. Piezoelectric elements are provided in a head unit corresponding to each of the plurality of nozzles. In addition, each of the piezoelectric elements operates according to the driving signal, and accordingly, a predetermined amount of ink is discharged from the corresponding nozzle at a predetermined timing. Accordingly, dots are formed on the medium. Such a piezoelectric element is a capacitive load, such as a capacitor, from an electrical point of view. Therefore, it is necessary to supply a sufficient current to operate the piezoelectric element that corresponds to each of the nozzles, and an ink jet printer or the like includes a driving signal output circuit having, for example, an amplifier circuit that outputs a driving signal capable of supplying a sufficient current to operate the piezoelectric element.

For example, JP-A-2015-164779 discloses a liquid discharge apparatus including a driving circuit which is a driving circuit (driving signal output circuit) outputting a driving signal for driving a piezoelectric element and uses a class D amplifier circuit capable of reducing power consumption.

In response to the recent market demand for further improved liquid discharge rate and miniaturization of the liquid discharge apparatus, the number of discharge sections of the liquid discharge apparatus is increasing day by day, and as the number of discharge sections increases, the amount of current output by the driving signal output circuit driving the discharge section is increasing together with the driving signal. However, when the amount of current output by the driving signal output circuit increases, heat generated by the driving signal output circuit increases, and operational stability of the driving signal output circuit decreases. As a result, the waveform accuracy of the driving signal may decrease. Furthermore, as the amount of current output by the driving signal output circuit increases, wiring impedance of a current path through which a current flow is greatly affected, and as a result, the operational stability of the driving signal output circuit may decrease and the waveform accuracy of the driving signal may decrease.

That is, in response to the recent market demand for further improved liquid discharge rate and miniaturization of the liquid discharge apparatus, when the number of discharge sections of the liquid discharge apparatus increases, the operational stability of the driving signal output circuit may decrease and the waveform accuracy of the driving signal may decrease. With respect to such a problem, the liquid discharge apparatus including the driving signal output circuit described in JP-A-2015-164779 is not sufficient, and there is room for further improvement.

SUMMARY

According to an aspect of the present disclosure, there is provided a liquid discharge apparatus including: a discharge head that includes a piezoelectric element and discharges a liquid by driving the piezoelectric element; and a driving signal output circuit that outputs a driving signal for driving the piezoelectric element, in which the driving signal output circuit includes an integrated circuit that outputs a first control signal and a second control signal, a first transistor to which the first control signal is input, a second transistor to which the second control signal is input, a coil that has one end electrically coupled to the first transistor and the second transistor, and the other end electrically coupled to the discharge head, and a substrate, the integrated circuit, the first transistor, the second transistor, and the coil are provided on the substrate, the first transistor is a surface-mount type flat non-lead package, and in the first transistor, change in whether or not a second terminal and a third terminal are electrically coupled to each other is made according to the first control signal input to a first terminal, the second transistor is a surface-mount type flat non-lead package, and in the first transistor, change in whether or not a fifth terminal and a sixth terminal are electrically coupled to each other is made according to the second control signal input to a fourth terminal, the coil is electrically coupled to the second terminal and the sixth terminal, a shortest distance between the second terminal and the one end of the coil is shorter than that between the third terminal and the one end of the coil, and a shortest distance between the sixth terminal and the one end of the coil is shorter than that between the fifth terminal and the one end of the coil.

DESCRIPTION OF EXEMPLARY EMBODIMENTS

Figure 1:
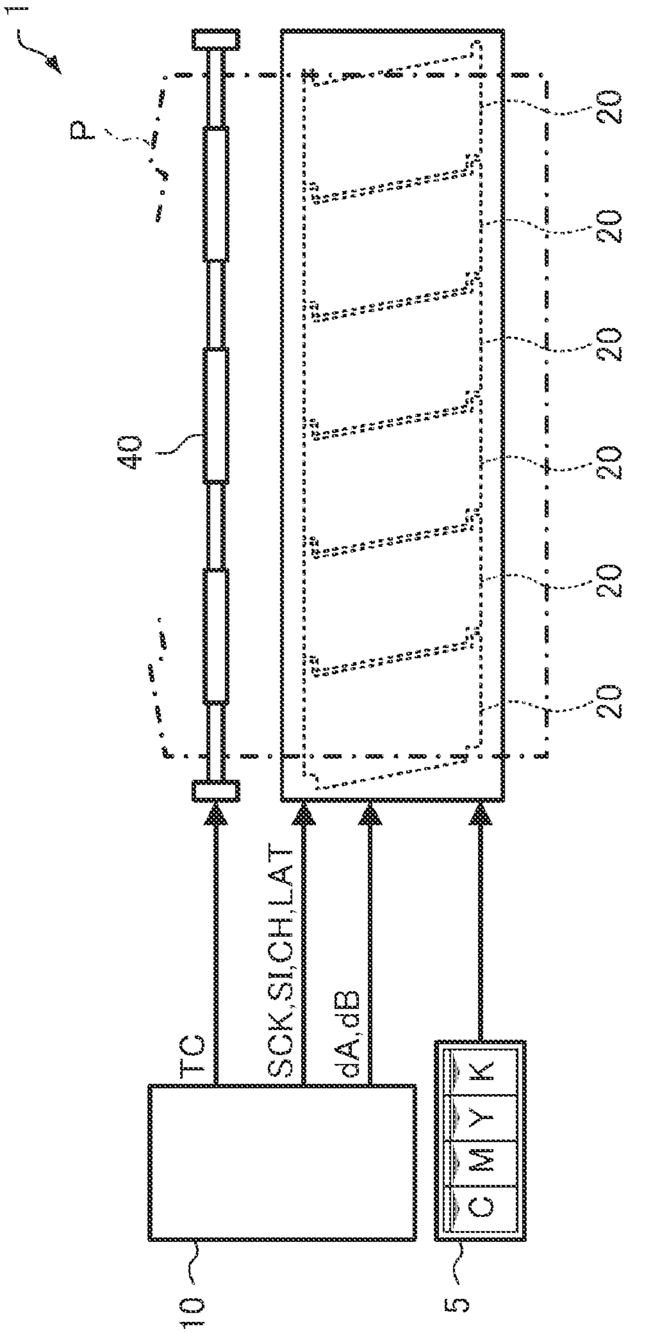
FIG. 1 is a view illustrating a schematic structure of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. Not all of the configurations which will be described below are necessarily essential components of the present disclosure.

1. Structure of Liquid Discharge Apparatus

A schematic structure of a liquid discharge apparatus 1 in the present embodiment will be described. FIG. 1 is a view illustrating a schematic structure of the liquid discharge apparatus 1. As illustrated in FIG. 1, the liquid discharge apparatus 1 includes a liquid container 5, a control unit 10, a head unit 2, and a transport unit 40.

Ink, which is an example of the liquid discharged to a medium P, is stored in the liquid container 5. Specifically, the liquid container 5 includes four containers in which the ink having four colors of cyan C, magenta M, yellow Y, and black K is individually stored. The ink stored in the liquid container 5 is supplied to the head unit 2 via a tube or the like. The number of containers in which ink is stored in the liquid container 5 is not limited to four. Further, the liquid container 5 may include a container in which ink of colors other than cyan C, magenta M, yellow Y, and black K is stored. Further, the liquid container 5 may include a plurality of containers containing any one of cyan C, magenta M, yellow Y, and black K.

The control unit 10 controls the operation of the liquid discharge apparatus 1 including the head unit 2 and the transport unit 40. The control unit 10 includes a system on chip (SoC) for controlling various operations of the liquid discharge apparatus 1 or a storage circuit that stores various information on the liquid discharge apparatus 1, an interface circuit for communicating with an external device such as a host computer provided outside the liquid discharge apparatus 1, and the like.

The control unit 10 receives an image signal input from the external device provided outside the liquid discharge apparatus 1. Then, the control unit 10 generates a print data signal SI, a latch signal LAT, a change signal CH, and a clock signal SCK by performing predetermined signal processing including image processing on the received image signal. Then, the control unit 10 outputs the generated print data signal SI, latch signal LAT, change signal CH, and clock signal SCK to the head unit 2. In addition, the control unit 10 generates reference driving signals dA and dB as a reference of driving signals COMA and COMB to be described later for driving a print head 20 of the head unit 2. Then, the control unit 10 outputs the generated reference driving signals dA and dB to the head unit 2.

The head unit 2 includes a plurality of print heads 20 provided side by side in a row. The head unit 2 distributes the ink supplied from the liquid container 5 to each of the plurality of print heads 20. Further, the head unit 2 generates the driving signals COMA and COMB to be described later for driving the print head 20 based on the reference driving signals dA and dB input from the control unit 10. The head unit 2 switches whether or not the driving signals COMA and COMB are supplied to the print head 20 at a timing defined by the print data signal SI, the latch signal LAT, the change signal CH, and the clock signal SCK which are input from the control unit 10. As a result, the plurality of print heads 20 discharge a predetermined amount of ink at a predetermined timing. Although FIG. 1 illustrates six print heads 20, the number of print heads 20 of the head unit 2 may be five or less or seven or more without being limited to six.

Further, the control unit 10 outputs a transport control signal TC to the transport unit 40. The transport unit 40 transports the medium P based on the transport control signal TC input from the control unit 10. The transport unit 40 includes, for example, a roller (not illustrated) for transporting the medium P, a motor for rotating the roller, or the like.

In the liquid discharge apparatus 1 configured as described above, the control unit 10 generates the print data signal SI, the latch signal LAT, the change signal CH, and the clock signal SCK based on the image signal input from the external device such as a host computer and uses the generated print data signal SI, latch signal LAT, change signal CH, and clock signal SCK to control discharge timing and amount of the ink discharged from the head unit 2 to the medium P and output the transport control signal TC to the transport unit 40, thereby controlling the transport of the medium P by the transport unit 40. As a result, the liquid discharge apparatus 1 can land the ink on the medium P at a desired position, and as a result, a desired image is formed on the medium P. That is, the liquid discharge apparatus 1 of the present embodiment is so-called a line-type ink jet printer that includes a line head provided with the plurality of print heads 20 arranged side by side in a direction intersecting a transport direction in which the medium P is transported, and discharges the ink to the transported medium P to form a desired image on the medium P.

The liquid discharge apparatus 1 is not limited to a line-type ink jet printer including the line head, and may be a so-called serial-type ink jet printer that includes the print head 20 mounted on a carriage that reciprocates along a main scanning direction, allows the carriage to move the medium P along the main scanning direction by the carriage as the medium P is transported, and discharges the ink.

2. Functional Configuration of Liquid Discharge Apparatus

Figure 2:
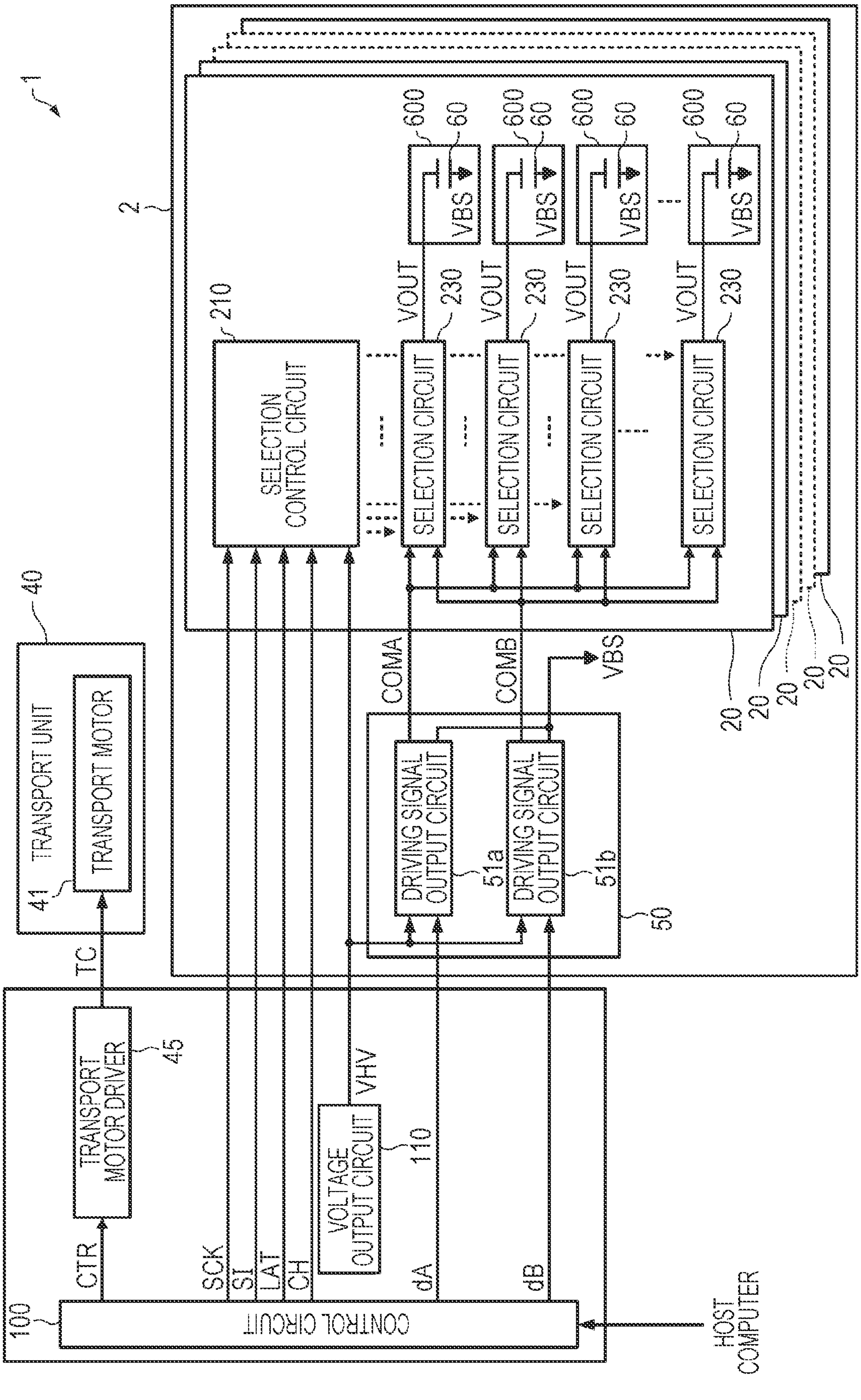
FIG. 2 is a view illustrating a functional configuration of the liquid discharge apparatus.

FIG. 2 is a view illustrating a functional configuration of the liquid discharge apparatus 1. As illustrated in FIG. 2, the liquid discharge apparatus 1 has the control unit 10, the head unit 2, and the transport unit 40.

The control unit 10 includes a control circuit 100, a transport motor driver 45, and a voltage output circuit 110.

The image signal is supplied from the external device such as a host computer, and the control circuit 100 thus generates various control signals corresponding to the image signal and outputs the generated control signals to the corresponding components.

Specifically, the control circuit 100 generates a control signal CTR and outputs the generated control signal to the transport motor driver 45 when the image signal is supplied to perform print processing on the medium P. The transport motor driver 45 generates the transport control signal TC for driving a transport motor 41 of the transport unit 40 in accordance with the input control signal CTR. Then, the transport motor driver 45 outputs the transport control signal TC to the transport motor 41. As a result, the transport motor 41 is driven, and the medium P is transported in response to the drive of the transport motor 41. That is, the transport of the medium P is controlled.

The control circuit 100 generates the clock signal SCK, the print data signal SI, the latch signal LAT, the change signal CH, and the reference driving signals dA and dB based on the image signal supplied from the external device, and outputs the generated clock signal SCK, print data signal SI, latch signal LAT, change signal CH, and reference driving signals dA and dB to the head unit 2.

The voltage output circuit 110 generates, for example, a voltage VHV having a DC voltage of 42 V and outputs the generated voltage VHV to the head unit 2. The voltage VHV is used as a power supply voltage or the like of various components of the head unit 2. Further, the voltage VHV output by the voltage output circuit 110 may be used as a power supply voltage having various components of the control unit 10 and the transport unit 40. The voltage output circuit 110 may generate a plurality of DC voltages such as a DC voltage of 5 V and a DC voltage of 3.3 V in addition to the voltage VHV which is a DC voltage of 42 V, and supply the generated DC voltages to the corresponding components.

The head unit 2 has a driving circuit 50 and the plurality of print heads 20.

The driving circuit 50 includes driving signal output circuits 51*a* and 51*b*. The digital reference driving signal dA and the voltage VHV are input to the driving signal output circuit 51*a*. Then, the driving signal output circuit 51*a* generates a driving signal COMA by converting the input reference driving signal dA in a digital/analog manner and applying class D amplification to the converted analog signal to a voltage value that corresponds to the voltage VHV. Then, the driving signal output circuit 51*a* outputs the generated driving signal COMA to the print head 20. Similarly, the digital reference driving signal dB and the voltage VHV are input to the driving signal output circuit 51*b*. The driving signal output circuit 51*b* generates a driving signal COMB by converting the input reference driving signal dB in a digital/analog manner and applying class D amplification to the converted analog signal to a voltage value that corresponds to the voltage VHV. Then, the driving signal output circuit 51*b* outputs the generated driving signal COMB to the print head 20.

That is, the reference driving signal dA is a signal that is the reference of the driving signal COMA and defines a waveform of the driving signal COMA, and the reference driving signal dB is the signal that is the reference of the driving signal COMB and defines a waveform of the driving signal COMB. Here, the reference driving signals dA and dB may be any signal that can define the waveforms of the driving signals COMA and COMB, and may be analog signals. Although FIG. 2 illustrates that the driving circuit 50 includes the head unit 2, the driving circuit 50 may be included in the control unit 10. In this case, the driving signals COMA and COMB generated by the control unit 10 may be supplied to the head unit 2. The details of configuration and operation of the driving signal output circuits 51*a* and 51*b* will be described later.

Furthermore, the driving circuit 50 generates a reference voltage signal VBS, which is a constant DC voltage having a voltage value of 5.5 V, 6 V, and the like, and outputs the generated reference voltage signal VBS to the print head 20. The reference voltage signal VBS functions as a reference potential for driving a piezoelectric element 60 of the print head 20. Therefore, the potential of the reference voltage signal VBS is not limited to 5.5 V and 6 V, and may be a ground potential.

Each of the plurality of print heads 20 includes a selection control circuit 210, a plurality of selection circuits 230, and a plurality of discharge sections 600 that correspond to each of the plurality of selection circuits 230. The selection control circuit 210 generates a selection signal for selecting or deselecting the waveforms of the driving signals COMA and COMB based on the clock signal SCK, the print data signal SI, the latch signal LAT, and the change signal CH supplied from the control circuit 100, and outputs the generated selection signal to each of the plurality of selection circuits 230.

The driving signals COMA and COMB and the selection signal output by the selection control circuit 210 are input to each of the selection circuits 230. The selection circuit 230 generates a driving signal VOUT based on the driving signals COMA and COMB by selecting or deselecting the waveforms of the driving signals COMA and COMB based on the input selection signal, and outputs the generated driving signal VOUT to the corresponding discharge section 600.

Each of the plurality of discharge sections 600 includes the piezoelectric element 60. The driving signal VOUT output from the corresponding selection circuit 230 is supplied to one end of the piezoelectric element 60. The reference voltage signal VBS is supplied to the other end of the piezoelectric element 60. Then, the piezoelectric element 60 is driven corresponding to the potential difference between the driving signal VOUT supplied to one end and the reference voltage signal VBS supplied to the other end. The ink having an amount that corresponds to the driving of the piezoelectric element 60 is discharged from the discharge section 600.

As described above, the liquid discharge apparatus 1 in the present embodiment includes the plurality of print heads 20 that includes the piezoelectric element 60 and drives the piezoelectric element 60 to discharge the ink as an example of the liquid, and the driving signal output circuits 51*a* and 51*b* that outputs the driving signals COMA and COMB which is the reference of the driving signal VOUT for driving the piezoelectric element 60.

Particularly, in response to a market demand for further improvement of discharge speed of the ink and reduction in size of the liquid discharge apparatus 1, it is assumed that in the liquid discharge apparatus 1 in the present embodiment, 5000 or more piezoelectric elements 60 are driven by the driving signals COMA and COMB output by one driving circuit 50. That is, the plurality of print heads 20 of the head unit 2 include 5000 or more piezoelectric elements 60, and the driving signal output circuits 51*a* and 51*b* supply the driving signals COMA and COMB to 5000 or more piezoelectric elements 60.

Specifically, in terms of further improvement of the ink discharge speed in the liquid discharge apparatus 1 and reduction in size of the liquid discharge apparatus 1, it is preferable that one driving circuit 50 drives the discharge sections 600 arranged side by side with a width of the medium P or more. In this case, when the print head 20 of the head unit 2 is a line head in which the discharge sections 600 are arranged side by side so that the ink can be discharged, at 600 dpi, to the medium P, which is A4 size (210 mm×297 mm: 8.27 inch×11.69 inch) sheet paper, the driving circuit 50 is required to drive the piezoelectric elements 60 of at least "600/inch×8.27 inch=4962" discharge sections 600. Furthermore, when a part of the discharge section 600 overlaps in a transport direction of the medium P in the liquid discharge apparatus 1, and when transport bending of the medium P transported by the transport unit 40 or the like is considered, the driving circuit 50 is required to drive at least 5000 or more discharge sections 600. That is, in the liquid discharge apparatus 1 of the present embodiment, the plurality of print heads 20 are line heads capable of discharging the ink to the medium P having an A4 size or more, and each of the driving signal output circuits 51*a* and 51*b* included in the driving circuit 50 drives 5000 or more piezoelectric elements 60 arranged side by side with a width of the medium P or more having an A4 size or more.

Here, the driving signal output circuit 51*a* is an example of the driving signal output circuit, and the driving signal output circuit 51*b* is another example of the driving signal output circuit. Further, the driving signal COMA output by the driving signal output circuit 51*a* is an example of the driving signal, the driving signal COMB output by the driving signal output circuit 51*b* is another example of the driving signal, and the driving signal VOUT generated by selecting or deselecting the waveforms of the driving signals COMA and COMB is also an example of the driving signal. Among the plurality of print heads 20, the print head 20 that discharges the ink by supplying the driving signal COMA output by the driving signal output circuit 51*a* is an example of a discharge head.

3. Configuration of Discharge Section

Figure 3:
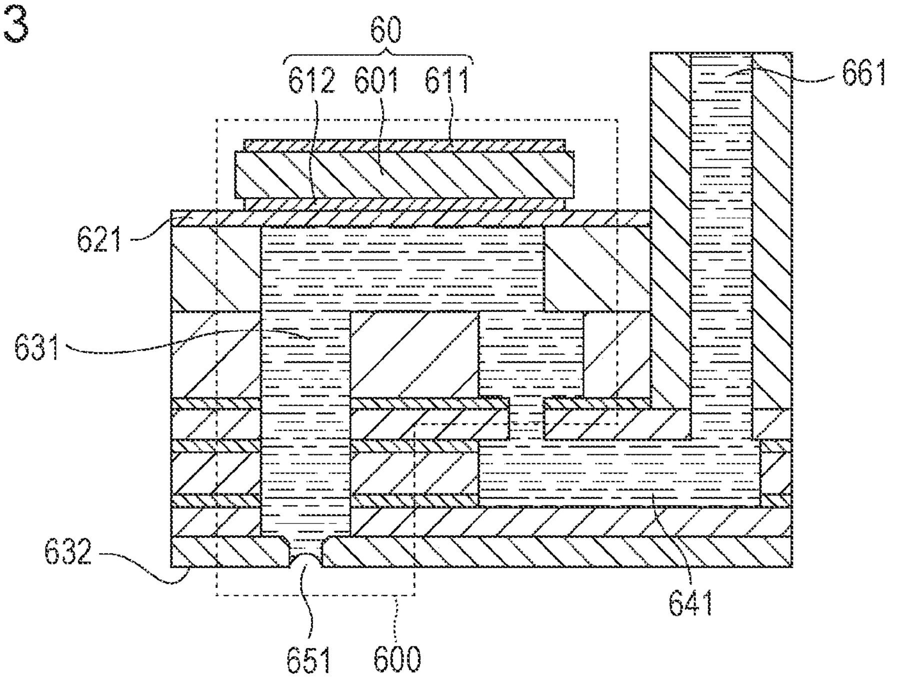
FIG. 3 is a view illustrating a schematic configuration of a discharge section.

Next, a configuration of the discharge section 600 of the print head 20 will be described. FIG. 3 is a view illustrating a schematic configuration of one discharge section 600 among the plurality of discharge sections 600 of the print head 20. As illustrated in FIG. 3, the discharge section 600 includes the piezoelectric element 60, a vibrating plate 621, a cavity 631, and a nozzle 651.

The cavity 631 is filled with ink supplied from a reservoir 641. The ink is introduced into the reservoir 641 from the liquid container 5 via an ink tube (not illustrated) and a supply port 661. In other words, the cavity 631 is filled with the ink stored in the corresponding liquid container 5.

The vibrating plate 621 is displaced by driving the piezoelectric element 60 provided on the upper surface in FIG. 3. Then, as the vibrating plate 621 is displaced, an internal volume of the cavity 631 filled with ink increases or decreases. In other words, the vibrating plate 621 functions as a diaphragm that changes the internal volume of the cavity 631.

The nozzle 651 is an opening portion which is provided on a nozzle plate 632 and communicates with the cavity 631. Then, as the internal volume of the cavity 631 changes, the ink having an amount depending on the change in internal volume is discharged from the nozzle 651.

The piezoelectric element 60 has a structure in which a piezoelectric body 601 is sandwiched between a pair of electrodes 611 and 612. In the piezoelectric body 601 having such a structure, the center part of the electrodes 611 and 612 bends in the up-down direction together with the vibrating plate 621 corresponding to the potential difference of the voltage supplied by the electrodes 611 and 612. Specifically, the driving signal VOUT is supplied to the electrode 611 of the piezoelectric element 60. The reference voltage signal VBS is supplied to the electrode 612 of the piezoelectric element 60. The piezoelectric element 60 bends in the upward direction when the voltage level of the driving signal VOUT increases, and bends in the downward direction when the voltage level of the driving signal VOUT decreases.

In the discharge section 600 configured as described above, the piezoelectric element 60 bends in the upward direction, and accordingly, the vibrating plate 621 is displaced and the internal volume of the cavity 631 increases. As a result, the ink is drawn from the reservoir 641. Meanwhile, the piezoelectric element 60 bends in the downward direction, and accordingly, the vibrating plate 621 is displaced and the internal volume of the cavity 631 decreases. As a result, the ink having an amount depending on the degree of reduction is discharged from the nozzle 651. In other words, the print head 20 includes the electrode 611 and the electrode 612, has the piezoelectric element 60 driven by a potential difference between the electrode 611 and the electrode 612, and discharges the ink by driving the piezoelectric element 60.

The piezoelectric element 60 is not limited to the structure illustrated in FIG. 3, and may be any structure as long as the ink can be discharged from the discharge section 600. That is, the piezoelectric element 60 is not limited to the above-described bending vibration configuration, and may be, for example, a configuration using longitudinal vibration.

4. Configuration and Operation of Print Head

Next, the configuration and operation of the print head 20 will be described. As described above, the print head 20 generates the driving signal VOUT by selecting or deselecting the waveforms of the driving signals COMA and COMB output from the driving circuit 50 based on the clock signal SCK, the print data signal SI, the latch signal LAT, and the change signal CH, and supplies the generated driving signal VOUT to the corresponding discharge section 600. Therefore, when describing the configuration and operation of the print head 20, first, an example of waveforms of the driving signals COMA and COMB and an example of a waveform of the driving signal VOUT will be described.

Figure 4:
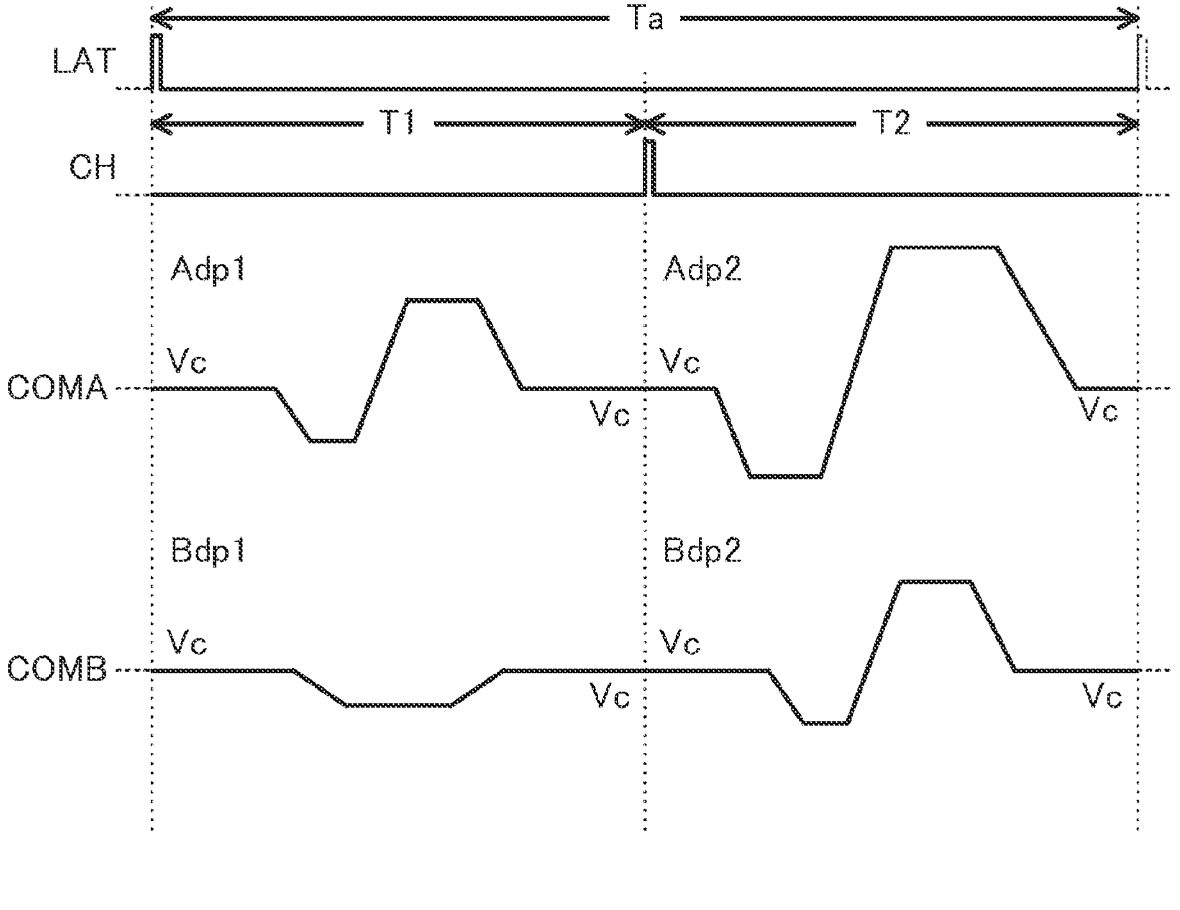
FIG. 4 is a diagram illustrating an example of waveforms of driving signals.

FIG. 4 is a diagram illustrating an example of waveforms of the driving signals COMA and COMB. As illustrated in FIG. 4, the driving signal COMA has a waveform in which a trapezoidal waveform Adp1 disposed in a period T1 from the rise of the latch signal LAT to the rise of the change signal CH, and a trapezoidal waveform Adp2 disposed in a period T2 from the rise of the change signal CH to the rise of the latch signal LAT are continuous to each other. The trapezoidal waveform Adp1 is a waveform for discharging a small amount of ink from the nozzle 651, and the trapezoidal waveform Adp2 is a waveform for discharging a medium amount of ink, which is more than a small amount, from the nozzle 651.

In addition, the driving signal COMB has a waveform in which a trapezoidal waveform Bdp1 disposed in the period T1 and a trapezoidal waveform Bdp2 disposed in the period T2 are continuous to each other. The trapezoidal waveform Bdp1 is a waveform that does not discharge the ink from the nozzle 651, and is a waveform for slightly vibrating the ink near the opening portion of the nozzle 651 to prevent an increase in ink viscosity. The trapezoidal waveform Bdp2 is a waveform that discharges a small amount of ink from the nozzle 651, similar to the trapezoidal waveform Adp1.

Both the voltages at the start timing and the end timing of each of the trapezoidal waveforms Adp1, Adp2, Bdp1, and Bdp2 are a voltage Vc which is a common voltage. In other words, each of the trapezoidal waveforms Adp1, Adp2, Bdp1, and Bdp2 is a waveform that starts at the voltage Vc and ends at the voltage Vc. Then, a cycle Ta including the period T1 and the period T2 corresponds to a printing cycle for forming new dots on the medium P.

Here, although FIG. 4 illustrates a case where the trapezoidal waveform Adp1 and the trapezoidal waveform Bdp2 have the same waveform, the trapezoidal waveform Adp1 and the trapezoidal waveform Bdp2 may be different waveforms. It is described that a small amount of ink is discharged from the corresponding nozzles 651 both when the trapezoidal waveform Adp1 is supplied to the discharge section 600 and when the trapezoidal waveform Bdp1 is supplied to the discharge section 600, but different amounts of ink may be discharged. In other words, the waveforms of the driving signals COMA and COMB are not limited to those illustrated in FIG. 4.

Figure 5:
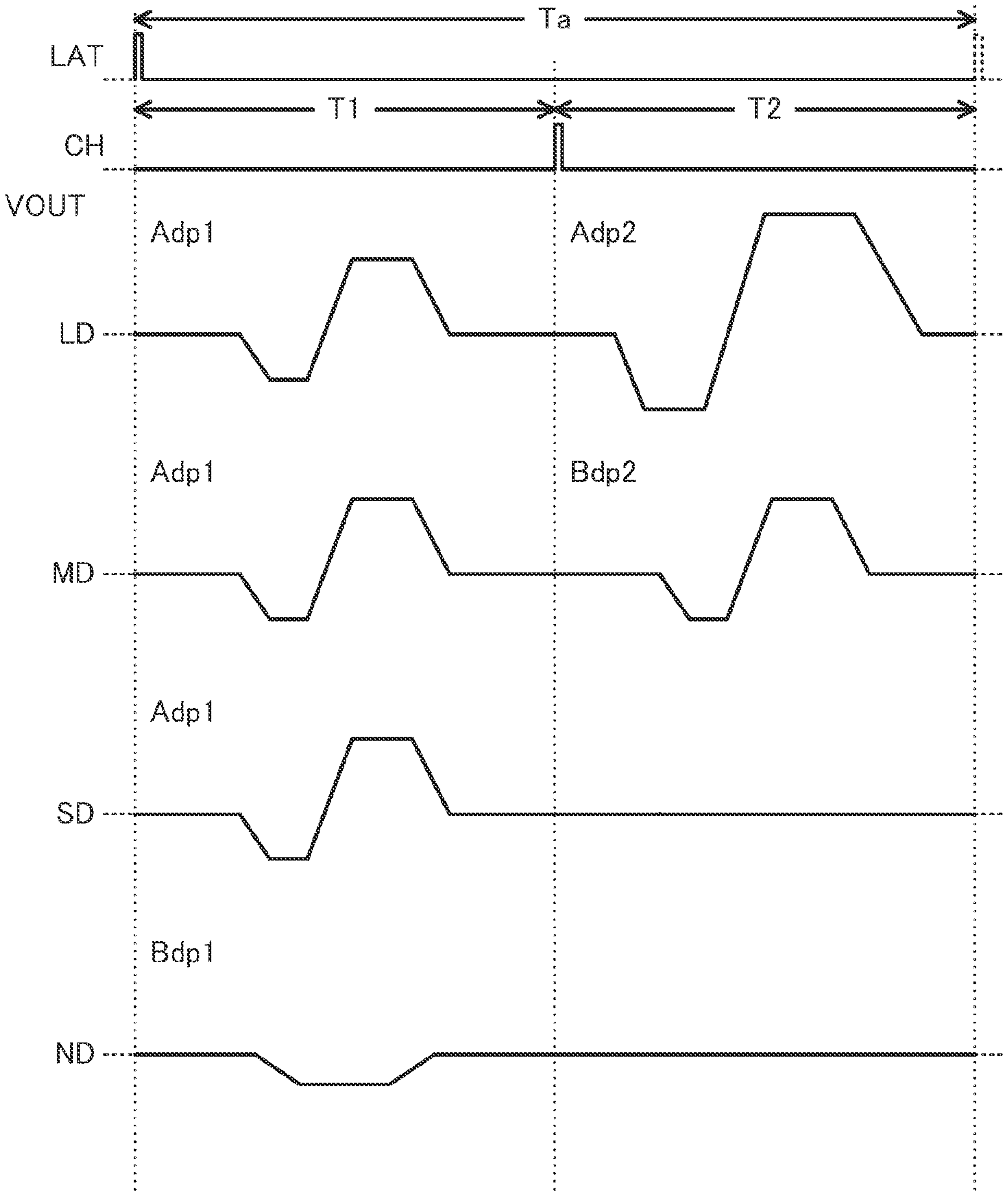
FIG. 5 is a diagram illustrating an example of a waveform of a driving signal.

FIG. 5 is a diagram illustrating an example of a waveform of the driving signal VOUT. FIG. 5 illustrates comparison of the waveform of the driving signal VOUT with waveforms of each case where the size of the dots formed on the medium P is any of a "large dot LD", a "medium dot MD", a "small dot SD", and "non-recording ND".

As illustrated in FIG. 5, the driving signal VOUT when the large dot LD is formed on the medium P has a waveform in which the trapezoidal waveform Adp1 disposed in the period T1 and the trapezoidal waveform Adp2 disposed in the period T2 in the cycle Ta are continuous to each other. When the driving signal VOUT is supplied to the discharge section 600, a small amount of ink and a medium amount of ink are discharged from the corresponding nozzles 651 in the cycle Ta. Therefore, on the medium P, each ink lands and coalesces to form the large dots LD.

The driving signal VOUT when the medium dot MD is formed on the medium P has a waveform in which the trapezoidal waveform Adp1 disposed in the period T1 and the trapezoidal waveform Bdp2 disposed in the period T2 are continuous to each other in the cycle Ta. When the driving signal VOUT is supplied to the discharge section 600, a small amount of ink is discharged twice from the corresponding nozzles 651 in the cycle Ta. Therefore, on the medium P, each ink lands and coalesces to form the medium dots MD.

The driving signal VOUT when the small dot SD is formed on the medium P has a waveform in which the trapezoidal waveform Adp1 disposed in the period T1 and a constant waveform disposed in the period T2 at the voltage Vc are continuous to each other in the cycle Ta. When the driving signal VOUT is supplied to the discharge section 600, a small amount of ink is discharged from the corresponding nozzles 651 in the cycle Ta. Therefore, on the medium P, each ink lands to form the small dots SD.

The driving signal VOUT that corresponds to the non-recording ND that does not form dots on the medium P has a waveform in which the trapezoidal waveform Bdp1 disposed in the period T1 and a constant waveform disposed in the period T2 at the voltage Vc are continuous to each other in the cycle Ta. When the driving signal VOUT is supplied to the discharge section 600, in the cycle Ta, only by the slight vibration of the ink near the opening portion of the corresponding nozzle 651, the ink is not discharged. Therefore, on the medium P, the ink does not land and no dot is formed.

Here, the constant waveform at the voltage Vc is a waveform in which the immediately preceding voltage Vc becomes a voltage held by the piezoelectric element 60 which is a capacitive load, when none of the trapezoidal waveforms Adp1, Adp2, Bdp1, and Bdp2 is selected as the driving signal VOUT. Therefore, when none of the trapezoidal waveforms Adp1, Adp2, Bdp1, and Bdp2 is selected as the driving signal VOUT, the voltage Vc is supplied to the discharge section 600 as the driving signal VOUT.

Figure 6:
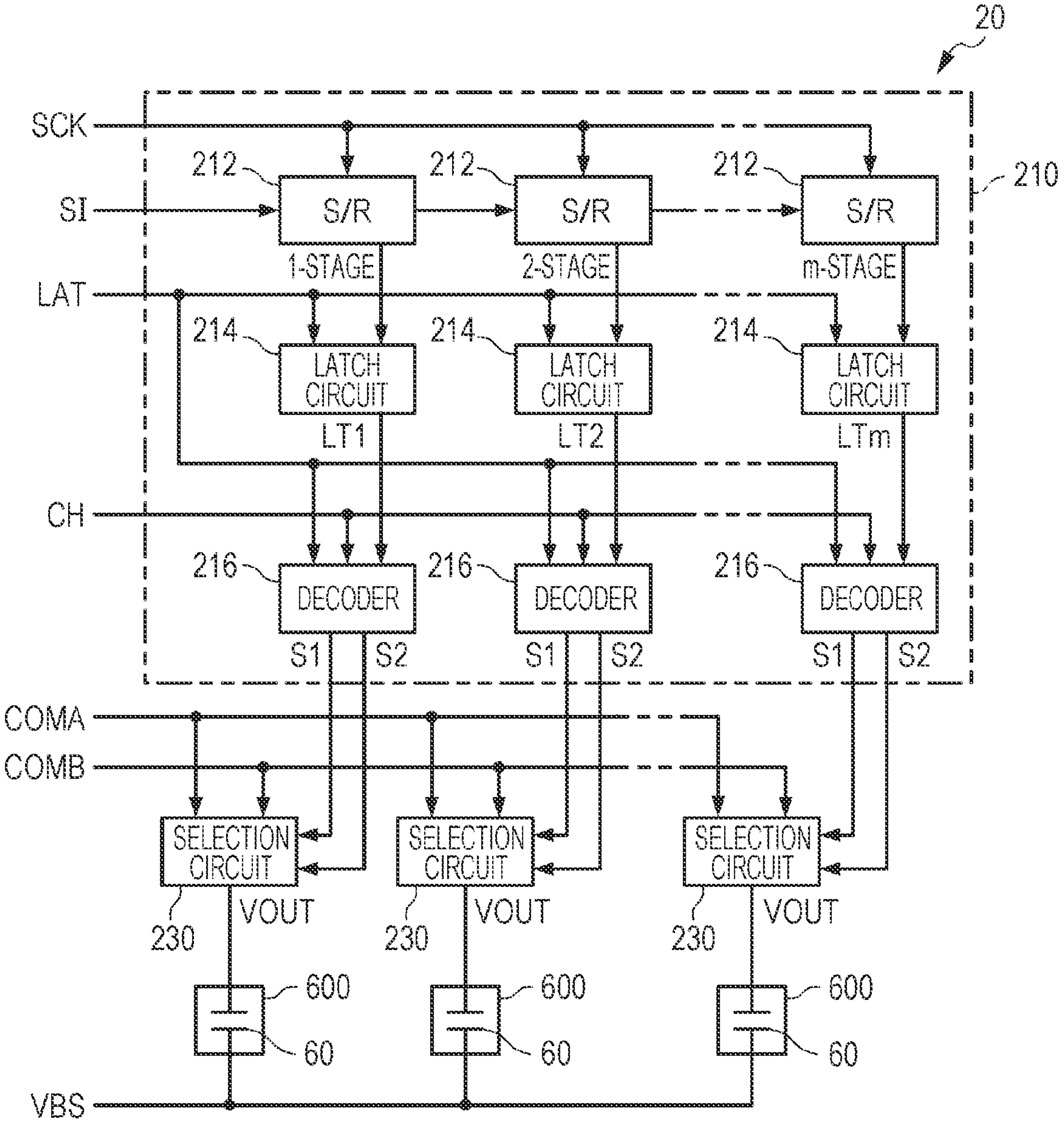
FIG. 6 is a view illustrating a configuration of a selection control circuit and a selection circuit.

The driving signal VOUT as described above is generated by selecting or deselecting the waveforms of the driving signals COMA and COMB by the operations of the selection control circuit 210 and the selection circuit 230. FIG. 6 is a view illustrating a configuration of the selection control circuit 210 and the selection circuit 230. As illustrated in FIG. 6, the print data signal SI, the latch signal LAT, the change signal CH, and the clock signal SCK are input to the selection control circuit 210. In the selection control circuit 210, sets of a shift register (S/R) 212, a latch circuit 214, and a decoder 216 are provided corresponding to each of m discharge sections 600. In other words, the selection control circuit 210 includes the same number of sets of the shift register 212, the latch circuit 214, and the decoder 216 as that of m discharge sections 600.

The print data signal SI is a signal synchronized with the clock signal SCK, and is a signal of a total of 2 m bits including 2-bit print data [SIH, SIL] for selecting any one of the large dot LD, the medium dot MD, the small dot SD, and the non-recording ND with respect to each of m discharge sections 600. The input print data signal SI is held in the shift register 212 for each of the two bits of print data [SIH, SIL] included in the print data signal SI, corresponding to m discharge sections 600. Specifically, in the selection control circuit 210, the m-stage shift registers 212 that correspond to m discharge sections 600 are vertically coupled to each other, and the serially input print data signal SI is sequentially transferred to the subsequent stage according to the clock signal SCK. In FIG. 6, in order to distinguish the shift registers 212 from each other, the shift register 212 is denoted as 1-stage, 2-stage, . . . , and m-stage in order from the upstream to which the print data signal SI is input.

Each of m latch circuits 214 latches the 2-bit print data [SIH, SIL] held by each of m shift registers 212 at the rise of the latch signal LAT.

Figures 7, 8:
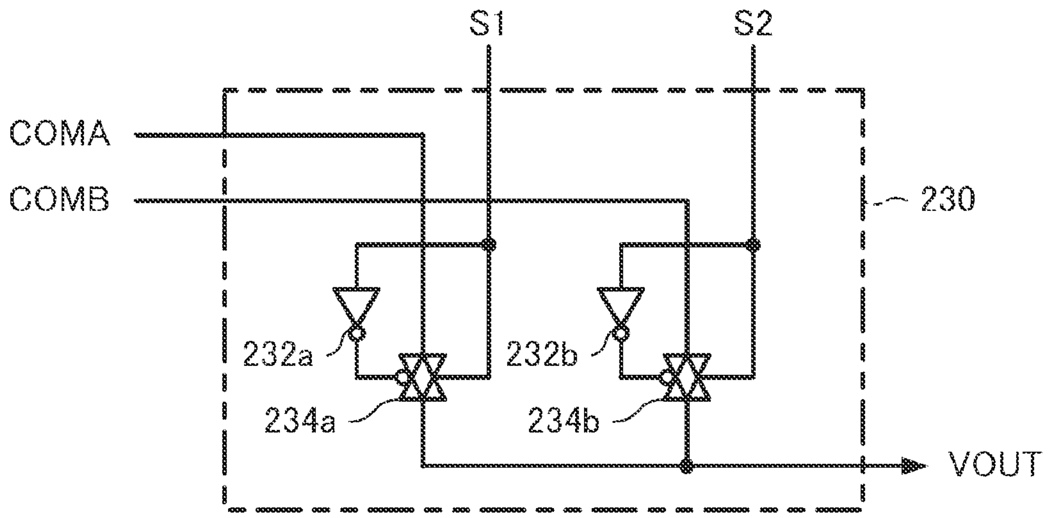
FIG. 7 is a diagram illustrating decoding contents in a decoder.
FIG. 8 is a view illustrating a configuration of the selection circuit.

FIG. 7 is a diagram illustrating the decoding contents in the decoder 216. The decoder 216 outputs the selection signals S1 and S2 according to the 2-bit print data [SIH, SIL] latched by the latch circuit 214. For example, when the 2-bit print data [SIH, SIL] is [1, 0], the decoder 216 outputs the logic level of the selection signal S1 as the H and L levels in the periods T1 and T2, and outputs the logic level of the selection signal S2 to the selection circuit 230 as the L and H levels in the periods T1 and T2.

The selection circuit 230 is provided corresponding to each of the discharge sections 600. In other words, the number of selection circuits 230 of the print head 20 is m, which is the same as the total number of the discharge sections 600. FIG. 8 is a view illustrating a configuration of the selection circuit 230 that corresponds to one discharge section 600. As illustrated in FIG. 8, the selection circuit 230 has inverters 232*a* and 232*b*, which are NOT circuits, and transfer gates 234*a* and 234*b*.

While the selection signal S1 is input to a positive control end, which is not marked with a circle, at the transfer gate 234*a*, the selection signal S1 is logically inverted by the inverter 232*a* and is input to a negative control end marked with a circle at the transfer gate 234*a*. The driving signal COMA is supplied to the input end of the transfer gate 234*a*. While the selection signal S2 is input to a positive control end, which is not marked with a circle at the transfer gate 234*b*, the selection signal S2 is logically inverted by the inverter 232*b* and is input to a negative control end marked with a circle at the transfer gate 234*b*. The driving signal COMB is supplied to the input end of the transfer gate 234*b*. Then, the output ends of the transfer gates 234*a* and 234*b* are commonly coupled to each other, and the signal is output as the driving signal VOUT.

Specifically, the transfer gate 234*a* conducts the input end and the output end to each other when the selection signal S1 is the H level, and does not conduct the input end and the output end to each other when the selection signal S1 is the L level. The transfer gate 234*b* conducts the input end and the output end to each other when the selection signal S2 is the H level, and does not conduct the input end and the output end to each other when the selection signal S2 is the L level. As described above, the selection circuit 230 generates the driving signal VOUT by selecting the waveforms of the driving signals COMA and COMB based on the selection signals S1 and S2, and outputs the generated driving signal VOUT.

Figure 9:
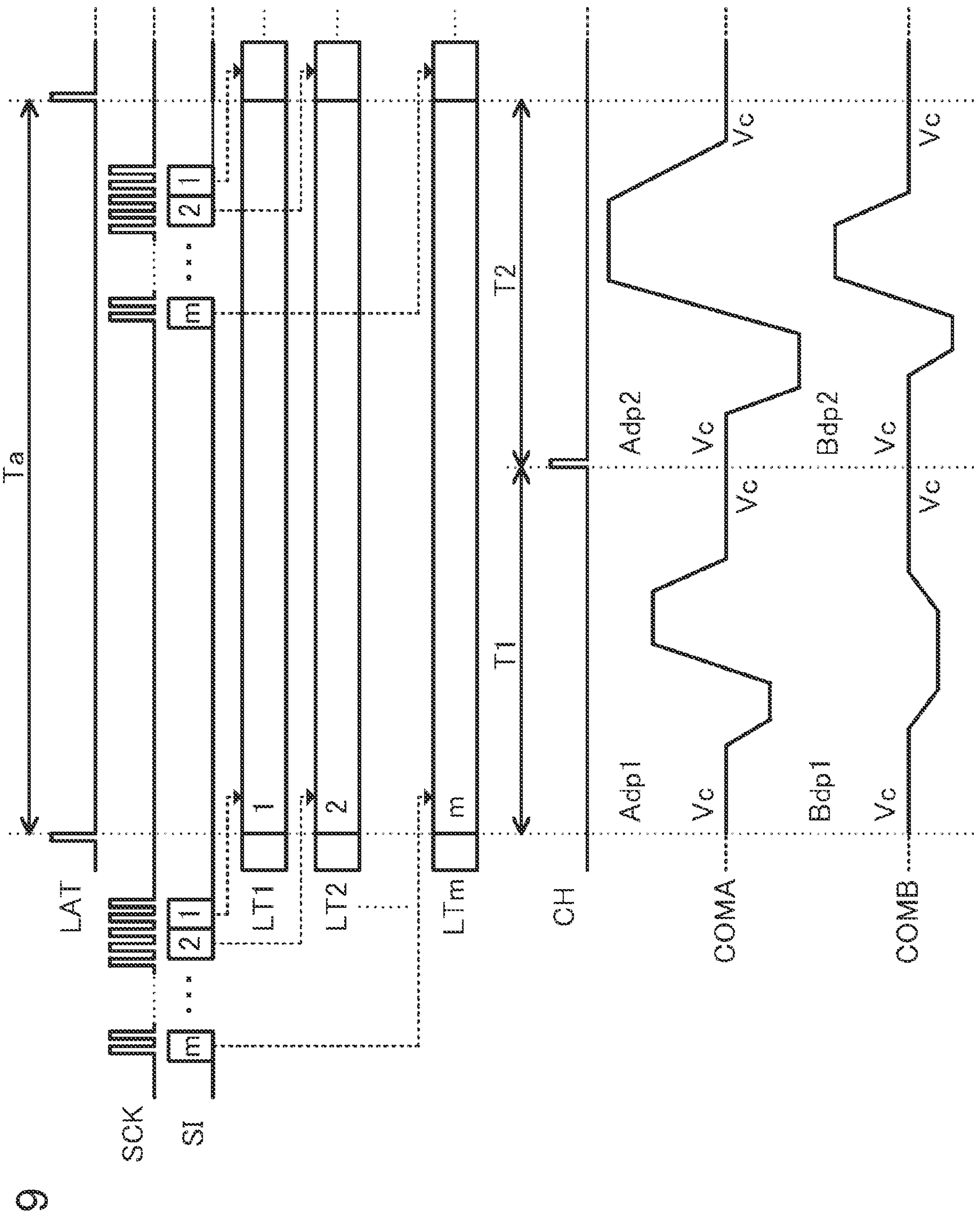
FIG. 9 is a diagram for describing operations of the selection control circuit and the selection circuit.

Here, the operations of the selection control circuit 210 and the selection circuit 230 will be described with reference to FIG. 9. FIG. 9 is a diagram for describing the operations of the selection control circuit 210 and the selection circuit 230. The print data signals SI are serially input in synchronization with the clock signal SCK and sequentially transferred in the shift register 212 that corresponds to the discharge section 600. Then, when the input of the clock signal SCK is stopped, the 2-bit print data [SIH, SIL] that corresponds to each of the discharge sections 600 is held in each of the shift registers 212. The print data signal SI is input in order that corresponds to the m-stage, . . . , 2-stage, and 1-stage discharge sections 600 of the shift register 212.

When the latch signal LAT rises, each of the latch circuits 214 latches the 2-bit print data [SIH, SIL] held in the shift register 212 all at once. In FIG. 9, LT1, LT2, . . . , and LTm indicate the 2-bit print data [SIH, SIL] latched by the latch circuit 214 that corresponds to the 1-stage, 2-stage, . . . , and the m-stage shift registers 212.

The decoder 216 outputs the logic levels of the selection signals S1 and S2 in each of the periods T1 and T2 with the contents illustrated in FIG. 7, depending on the size of the dot defined by the latched 2-bit print data [SIH, SIL].

Specifically, when the input print data [SIH, SIL] is [1, 1], the decoder 216 sets the selection signal S1 to the H and H levels in the periods T1 and T2, and sets the selection signal S2 to the L and L levels in the periods T1 and T2. In this case, the selection circuit 230 selects the trapezoidal waveform Adp1 in the period T1 and selects the trapezoidal waveform Adp2 in the period T2. As a result, the driving signal VOUT that corresponds to the large dot LD illustrated in FIG. 5 is generated.

In addition, when the print data [SIH, SIL] is [1, 0], the decoder 216 sets the selection signal S1 to the H and L levels in the periods T1 and T2, and sets the selection signal S2 to the L and H levels in the periods T1 and T2. In this case, the selection circuit 230 selects the trapezoidal waveform Adp1 in the period T1 and selects the trapezoidal waveform Bdp2 in the period T2. As a result, the driving signal VOUT that corresponds to the medium dot MD illustrated in FIG. 5 is generated.

In addition, when the print data [SIH, SIL] is [0, 1], the decoder 216 sets the selection signal S1 to the H and L levels in the periods T1 and T2, and sets the selection signal S2 to the L and L levels in the periods T1 and T2. In this case, the selection circuit 230 selects the trapezoidal waveform Adp1 in the period T1 and selects none of the trapezoidal waveforms Adp2 and Bdp2 in the period T2. As a result, the driving signal VOUT that corresponds to the small dot SD illustrated in FIG. 5 is generated.

In addition, when the print data [SIH, SIL] is [0, 0], the decoder 216 sets the selection signal S1 to the L and L levels in the periods T1 and T2, and sets the selection signal S2 to the H and L levels in the periods T1 and T2. In this case, the selection circuit 230 selects the trapezoidal waveform Bdp1 in the period T1 and selects none of the trapezoidal waveforms Adp2 and Bdp2 in the period T2. As a result, the driving signal VOUT that corresponds to the non-recording ND illustrated in FIG. 5 is generated.

As described above, the selection control circuit 210 and the selection circuit 230 select the waveforms of the driving signals COMA and COMB based on the print data signal SI, the latch signal LAT, the change signal CH, and the clock signal SCK, and outputs the selected waveforms to the discharge section 600 as the driving signal VOUT.

5. Configuration of Driving Signal Output Circuit

Next, the configuration and operations of the driving signal output circuits 51*a* and 51*b* of the driving circuit 50 will be described. Here, the driving signal output circuits 51*a* and 51*b* differ only in the input signal and the output signal, and have the same configuration. Therefore, in the following description, the configuration and operations of the driving signal output circuit 51*a* that outputs the driving signal COMA based on the reference driving signal dA will be described, and detailed descriptions of the configuration and operations of the driving signal output circuit 51*b* that outputs the driving signal COMB based on the reference driving signal dB will be omitted.

Figure 10:
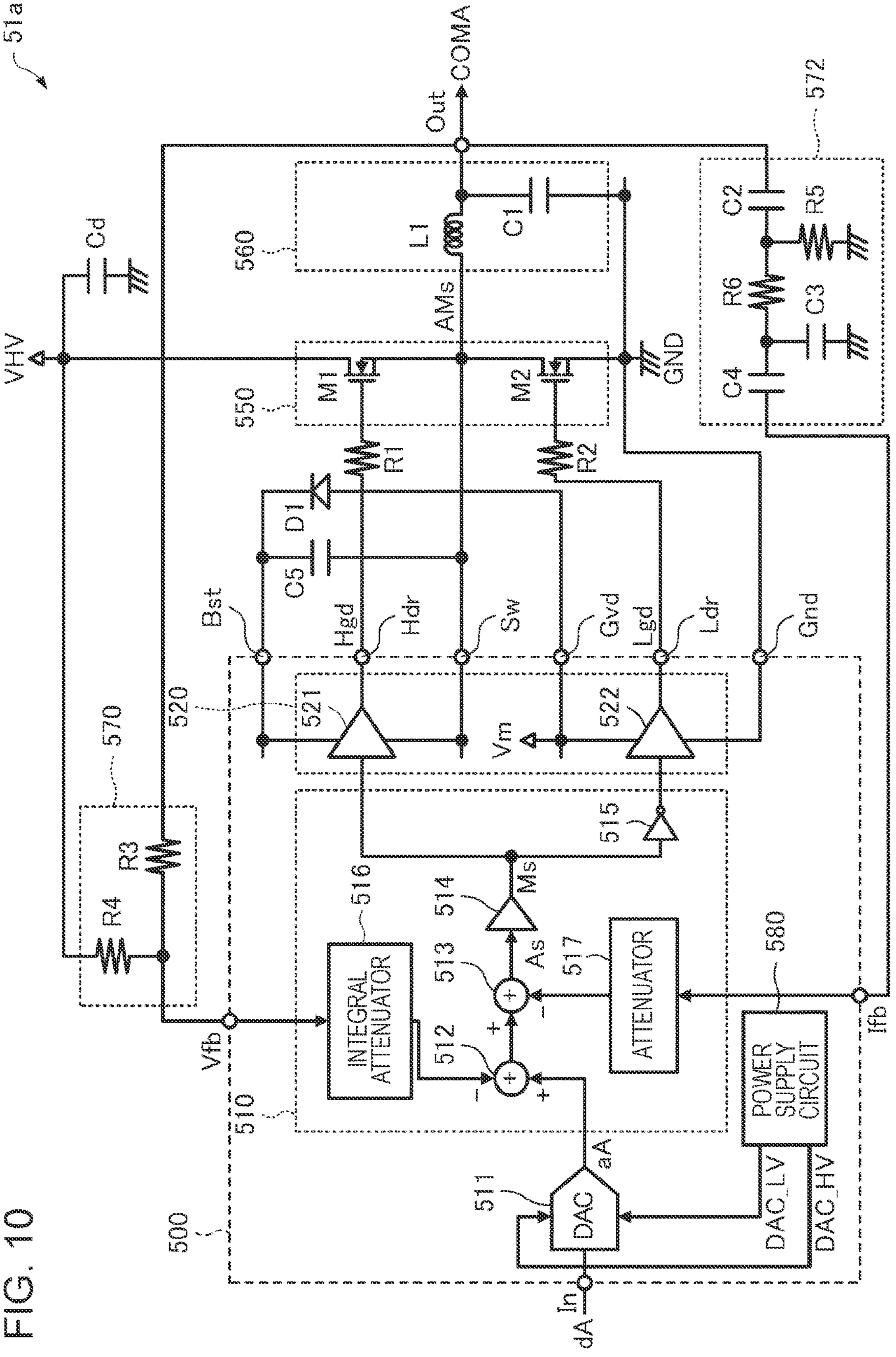
FIG. 10 is a view illustrating a configuration of a driving signal output circuit.

FIG. 10 is a view illustrating a configuration of the driving signal output circuit 51*a*. As illustrated in FIG. 10, the driving signal output circuit 51*a* includes an integrated circuit 500 including a modulation circuit 510, an amplifier circuit 550, a smoothing circuit 560, feedback circuits 570 and 572, and a plurality of other circuit elements. The integrated circuit 500 outputs a gate signal Hgd and a gate signal Lgd based on the reference driving signal dA which is the reference of the driving signal COMA. The amplifier circuit 550 includes a transistor M1 driven by the gate signal Hgd and a transistor M2 driven by the gate signal Lgd, generates an amplified-modulated signal AMs, and outputs the amplified-modulated signal AMs to the smoothing circuit 560. The smoothing circuit 560 smooths the amplified-modulated signal AMs, which is the output from the amplifier circuit 550, and outputs the smoothed amplified-modulated signal AMs as the driving signal COMA.

The integrated circuit 500 is electrically coupled to the outside of the integrated circuit 500 via a plurality of terminals including a terminal In, a terminal Bst, a terminal Hdr, a terminal Sw, a terminal Gvd, a terminal Ldr, a terminal Gnd, and a terminal Vbs. The integrated circuit 500 modulates the reference driving signal dA input from the terminal In, outputs the gate signal Hgd for driving the transistor M1 of the amplifier circuit 550 from the terminal Hdr, and outputs the gate signal Lgd for driving the transistor M2 from the terminal Ldr. In other words, the integrated circuit 500 has the terminal Hdr that outputs the gate signal Hgd input to the transistor M1 and the terminal Ldr that outputs the gate signal Lgd input to the transistor M2.

The integrated circuit 500 includes a digital to analog converter (DAC) 511, the modulation circuit 510, a gate driving circuit 520, and a power supply circuit 580.

The power supply circuit 580 generates a first voltage signal DAC_HV and a second voltage signal DAC_LV, and supplies the generated signals to the DAC 511.

The DAC 511 converts the digital reference driving signal dA that defines the waveform of the driving signal COMA into a reference driving signal aA which is an analog signal of the voltage value between the first voltage signal DAC_HV and the second voltage signal DAC_LV, and outputs the reference driving signal aA to the modulation circuit 510. The maximum value of the voltage amplitude of the reference driving signal aA is defined by the first voltage signal DAC_HV, and the minimum value thereof is defined by the second voltage signal DAC_LV. In other words, the first voltage signal DAC_HV is a reference voltage on a high voltage side of the DAC 511, and the second voltage signal DAC_LV is a reference voltage on a low voltage side of the DAC 511. Then, a signal obtained by amplifying the analog reference driving signal aA becomes the driving signal COMA. In other words, the reference driving signal aA corresponds to a target signal before amplification of the driving signal COMA. The voltage amplitude of the reference driving signal aA in the present embodiment is, for example, 1 V to 2 V.

The modulation circuit 510 generates a modulated signal Ms obtained by modulating the reference driving signal aA, and outputs the generated modulated signal Ms to the amplifier circuit 550 via the gate driving circuit 520. The modulation circuit 510 includes adders 512 and 513, a comparator 514, an inverter 515, an integral attenuator 516, and an attenuator 517.

The integral attenuator 516 attenuates and integrates a voltage of a terminal Out input via a terminal Vfb, that is, the driving signal COMA, and supplies the driving signal COMA to the input end on the − side of the adder 512. The reference driving signal aA is input to the input end on the + side of the adder 512. Then, the adder 512 supplies the voltage obtained by subtracting and integrating the voltage input to the input end on the − side from the voltage input to the input end on the + side, to the input end on the + side of the adder 513.

Here, while the maximum value of the voltage amplitude of the reference driving signal aA is approximately 2 V as described above, there is a case where the maximum value of the voltage of the driving signal COMA exceeds 40 V. Therefore, the integral attenuator 516 attenuates the voltage of the driving signal COMA input via the terminal Vfb in order to match the amplitude ranges of both voltages when obtaining the deviation.

The attenuator 517 supplies a voltage obtained by attenuating the high frequency component of the driving signal COMA input via a terminal Ifb, to the input end on the − side of the adder 513. The voltage output from the adder 512 is input to the input end on the + side of the adder 513. Then, the adder 513 outputs a voltage signal As, which is obtained by subtracting the voltage input to the input end on the − side from the voltage input to the input end on the + side, to the comparator 514.

The voltage signal As output from the adder 513 is a voltage obtained by subtracting the voltage of the signal supplied to the terminal Vfb, and further subtracting the voltage of the signal supplied to the terminal Ifb, from the voltage of the reference driving signal aA. Therefore, the voltage of the voltage signal As output from the adder 513 becomes a signal obtained by correcting the deviation, which is obtained by subtracting the attenuated voltage of the driving signal COMA from the voltage of the target reference driving signal aA, with the high frequency component of the driving signal COMA.

The comparator 514 outputs the modulated signal Ms that is pulse-modulated based on the voltage signal As output from the adder 513. Specifically, the comparator 514 outputs the modulated signal Ms that becomes an H level when the voltage signal As output from the adder 513 reaches a predetermined threshold value Vth1 (which will be described later) or greater when the voltage rises, and becomes an L level when the voltage signal As falls below a predetermined threshold value Vth2 (which will be described later) when the voltage drops. Here, the threshold values Vth1 and Vth2 are set in the relationship of threshold value Vth1>threshold value Vth2. The frequency and duty ratio of the modulated signal Ms change according to the reference driving signals dA and aA. Therefore, as the attenuator 517 adjusts the modulation gain that corresponds to the sensitivity, it is possible to adjust the amount of change in the frequency and duty ratio of the modulated signal Ms.

The modulated signal Ms output from the comparator 514 is supplied to a gate driver 521 included in the gate driving circuit 520. The modulated signal Ms is also supplied to the gate driver 522 included in the gate driving circuit 520 after the logic level is inverted by the inverter 515. In other words, the logic levels of the signals supplied to the gate driver 521 and the gate driver 522 are in a relationship exclusive to each other.

Here, the timing may be controlled such that the logic levels of the signals supplied to the gate driver 521 and the gate driver 522 do not become the H level at the same time. In other words, strictly speaking, the relationship exclusive to each other means that the logic levels of the signals supplied to the gate driver 521 and the gate driver 522 do not become the H level at the same time, and more specifically means that the transistor M1 and the transistor M2 included in the amplifier circuit 550 are not turned on at the same time.

The gate driving circuit 520 includes the gate driver 521 and the gate driver 522.

The gate driver 521 level-shifts the modulated signal Ms output from the comparator 514 and outputs the level-shifted modulated signal Ms from the terminal Hdr as the gate signal Hgd. The higher side of the power supply voltage of the gate driver 521 is a voltage applied via the terminal Bst, and the lower side is a voltage applied via the terminal Sw. The terminal Bst is coupled to one end of a capacitor C5 and the cathode of a diode Dl for preventing a reverse flow. The terminal Sw is coupled to the other end of the capacitor C5. The anode of the diode Dl is coupled to the terminal Gvd. Accordingly, the anode of the diode Dl is supplied with a voltage Vm, which is a DC voltage of, for example, 7.5 V, supplied from a power supply circuit (not illustrated). Therefore, the potential difference between the terminal Bst and the terminal Sw is approximately equal to the potential difference between both ends of the capacitor C5, that is, the voltage Vm. Then, the gate driver 521 generates the gate signal Hgd having a voltage greater than that of the terminal Sw by the voltage Vm following the input modulated signal Ms, and outputs the generated gate signal Hgd from the terminal Hdr.

The gate driver 522 operates on the lower potential side than that of the gate driver 521. The gate driver 522 level-shifts the signal in which the logic level of the modulated signal Ms output from the comparator 514 is inverted by the inverter 515, and outputs the level-shifted signal from the terminal Ldr as the gate signal Lgd. The voltage Vm is applied to the higher side of the power supply voltage of the gate driver 522, and a ground potential of, for example, 0 V is supplied to the lower side via the terminal Gnd. Then, the gate driver 522 generates the gate signal Lgd having a voltage greater than that of the terminal Gnd by the voltage Vm following the signal input to the gate driver 522, and outputs the generated gate signal Lgd from the terminal Ldr.

The amplifier circuit 550 includes the transistors M1 and M2. A voltage VHV, which is a DC voltage of, for example, 42 V, is supplied to a drain terminal of the transistor M1. A gate terminal of the transistor M1 is electrically coupled to one end of a resistor R1, and the other end of the resistor R1 is electrically coupled to the terminal Hdr of the integrated circuit 500. In other words, the gate signal Hgd output from the terminal Hdr of the integrated circuit 500 is supplied to the gate terminal of the transistor M1. A source terminal of the transistor M1 is electrically coupled to the terminal Sw of the integrated circuit 500.

A drain terminal of the transistor M2 is electrically coupled to the terminal Sw of the integrated circuit 500. In other words, the drain terminal of the transistor M2 and the source terminal of the transistor M1 are electrically coupled to each other. A gate terminal of the transistor M2 is electrically coupled to one end of a resistor R2, and the other end of the resistor R2 is electrically coupled to the terminal Ldr of the integrated circuit 500. In other words, the gate signal Lgd output from the terminal Ldr of the integrated circuit 500 is supplied to the gate terminal of the transistor M2. The ground potential is supplied to the source terminal of the transistor M2.

In the amplifier circuit 550 configured as described above, when the transistor M1 is controlled to be turned off and the transistor M2 is controlled to be turned on, the voltage of the node to which the terminal Sw is coupled becomes the ground potential. Therefore, the voltage Vm is supplied to the terminal Bst. Meanwhile, when the transistor M1 is controlled to be turned on and the transistor M2 is controlled to be turned off, the voltage of the node to which the terminal Sw is coupled becomes the voltage VHV. Therefore, a voltage signal having a potential of a voltage VHV+Vm is supplied to the terminal Bst.

In other words, the gate driver 521 that drives the transistor M1 uses the capacitor C5 as a floating power supply, the potential of the terminal Sw changes to 0 V or the voltage VHV corresponding to the operation of the transistor M1 and the transistor M2, and accordingly, the gate driver 521 supplies the gate signal Hgd, of which the L level that is a potential of the voltage VHV and the H level that is the potential of the voltage VHV+the voltage Vm, to the gate terminal of the transistor M1.

Meanwhile, the gate driver 522 that drives the transistor M2 supplies the gate signal Lgd, of which the L level is the ground potential and the H level is the potential of the voltage Vm, to the gate terminal of the transistor M2, regardless of the operation of the transistor M1 and the transistor M2.

As described above, the amplifier circuit 550 amplifies the modulated signal Ms obtained by modulating the reference driving signals dA and aA by the transistor M1 and the transistor M2 based on the voltage VHV, generates the amplified-modulated signal AMs at a coupling point where the source terminal of the transistor M1 and the drain terminal of the transistor M2 are commonly coupled to each other, and outputs the generated amplified-modulated signal AMs to the smoothing circuit 560.

Here, a capacitor Cd is located in a propagation path for propagating the voltage VHV input to the amplifier circuit 550. Specifically, the voltage VHV is supplied to one end of the capacitor Cd, and a ground potential is supplied to the other end. The capacitor Cd reduces the possibility that the potential of the voltage VHV fluctuates due to the operation of the amplifier circuit 550. In other words, the capacitor Cd stabilizes the potential of the voltage VHV. Such a capacitor preferably has a large capacity, and for example, an electrolytic capacitor is used.

The smoothing circuit 560 generates the driving signal COMA by smoothing the amplified-modulated signal AMs output from the amplifier circuit 550, and outputs the generated driving signal COMA from the driving signal output circuit 51*a*.

The smoothing circuit 560 includes a coil L1 and a capacitor C1. One end of the coil L1 is electrically coupled to the source terminal of the transistor M1 and the drain terminal of the transistor M2. Accordingly, the amplified-modulated signal AMs output from the amplifier circuit 550 is input to one end of the coil L1. Further, the other end of the coil L1 is coupled to the terminal Out which is the output of the driving signal output circuit 51*a*. The other end of the coil L1 is also coupled to one end of the capacitor C1. A ground potential is supplied to the other end of the capacitor C1. In other words, the coil L1 and the capacitor C1 demodulates the amplified-modulated signal AMs output from the amplifier circuit 550 by smoothing the amplified-modulated signal AMs, and outputs the demodulated amplified-modulated signal AMs as the driving signal COMA. In other words, the other end of the coil L1 is electrically coupled to the print head 20.

The feedback circuit 570 includes a resistor R3 and a resistor R4. One end of the resistor R3 is coupled to the terminal Out from which the driving signal COMA is output, and the other end thereof is coupled to the terminal Vfb and one end of the resistor R4. The voltage VHV is supplied to the other end of the resistor R4. Accordingly, the driving signal COMA that passes through the feedback circuit 570 from the terminal Out is fed back to the terminal Vfb in a pulled-up state.

The feedback circuit 572 includes capacitors C2, C3, and C4 and resistors R5 and R6. One end of the capacitor C2 is coupled to the terminal Out from which the driving signal COMA is output, and the other end thereof is coupled to one end of the resistor R5 and one end of the resistor R6. A ground potential is supplied to the other end of the resistor R5. Accordingly, the capacitor C2 and the resistor R5 function as a high pass filter. A cutoff frequency of the high pass filter is set to, for example, approximately 9 MHz. The other end of the resistor R6 is coupled to one end of the capacitor C4 and one end of the capacitor C3. The ground potential is supplied to the other end of the capacitor C3. Accordingly, the resistor R6 and the capacitor C3 function as a low pass filter. The cutoff frequency of the low pass filter is set to, for example, approximately 160 MHz. As such, the feedback circuit 572 includes the high pass filter and the low pass filter, and thus the feedback circuit 572 functions as a band pass filter that allows the driving signal COMA to pass through a predetermined frequency range.

The other end of the capacitor C4 is coupled to the terminal Ifb of the integrated circuit 500. Accordingly, a signal, in which the DC component is cut among the high frequency components of the driving signal COMA passing through the feedback circuit 572, is fed back to the terminal Ifb, the feedback circuit 572 functioning as the band pass filter that allows the signal to pass through a predetermined frequency components.

Incidentally, the driving signal COMA output from the terminal Out is a signal obtained by smoothing the amplified-modulated signal AMs based on the reference driving signal dA by the smoothing circuit 560. The driving signal COMA is integrated and subtracted via the terminal Vfb, and then fed back to the adder 512. Accordingly, the driving signal output circuit 51*a* self-excited oscillates at a frequency determined by the feedback delay and the feedback transfer function. However, since the feedback path via the terminal Vfb has a large delay amount, the frequency of self-excited oscillation cannot be high enough to ensure the accuracy of the driving signal COMA only by the feedback via the terminal Vfb. Here, by providing a path for feeding back the high frequency component of the driving signal COMA via the terminal Ifb separately from the path via the terminal Vfb, the delay in the entire circuit is reduced. Accordingly, the frequency of the voltage signal As can be made high enough to ensure the accuracy of the driving signal COMA compared to a case where the path via the terminal Ifb does not exist.

Here, an oscillation frequency of self-excited oscillation of the driving signal output circuit 51*a* in the present embodiment is preferably 1 MHz or more and 8 MHz or less in terms of reducing the heat generated by the driving signal output circuit 51*a* while sufficiently ensuring the accuracy of the driving signal COMA. Particularly, when reducing power consumption of the liquid discharge apparatus 1, the oscillation frequency of self-excited oscillation of the driving signal output circuit 51*a* is preferably 1 MHz or more or 4 MHz or less. In other words, driving frequencies of the transistors M1 and M2 are preferably 1 MHz or more and 8 MHz or less in terms of reducing heat generated by the transistors M1 and M2. Furthermore, as the loss generated by the transistors M1 and M2 is reduced, when reducing the power consumption of the liquid discharge apparatus 1, the driving frequencies of the transistors M1 and M2 are preferably 1 MHz or more and 4 MHz or less.

In the liquid discharge apparatus 1 of the present embodiment, the driving signal output circuit 51*a* smooths the amplified-modulated signals AMs to generate a driving signal COMA, which is supplied to the piezoelectric element 60 of the print head 20. The piezoelectric element 60 is driven by being supplied with a signal waveform of the driving signal COMA. In addition, the ink having an amount that corresponds to the driving of the piezoelectric element 60 is discharged from the discharge section 600.

When frequency spectrum analysis is performed on the signal waveform of the driving signal COMA that drives the piezoelectric element 60, it is known that the driving signal COMA has a frequency component of 50 kHz or more. When the signal waveform of the driving signal COMA having such a frequency component of 50 kHz or more is accurately generated, if the frequency of the modulated signal is lower than 1 MHz, rounding on an edge portion of the signal waveform of the driving signal COMA output from the driving signal output circuit 51*a* occurs. In other words, in order to accurately generate the signal waveform of the driving signal COMA, the frequency of the modulated signal Ms needs to be 1 MHz or more. When the driving frequencies of the transistors M1 and M2, which are oscillation frequencies of self-excited oscillation of the driving signal output circuit 51*a*, are 1 MHz or less, the driving accuracy of the piezoelectric element 60 decreases in response to a decrease in waveform accuracy of the driving signal COMA, and as a result, discharge characteristics of the ink discharged from the liquid discharge apparatus 1 may deteriorate.

To solve such a problem, the frequency of the modulated signal Ms and the driving frequencies of the transistors M1 and M2, which are the oscillation frequencies of self-excited oscillation of the driving signal output circuit 51*a*, are set to 1 MHz or more, thereby reducing the possibility that rounding on the edge portion of the signal waveform of the driving signal COMA occurs. That is, the waveform accuracy of the signal waveform of the driving signal COMA is improved, and the driving accuracy of the piezoelectric element 60 driven based on the driving signal COMA is improved. Therefore, the possibility that the discharge characteristics of the ink discharged from the liquid discharge apparatus 1 are deteriorated is reduced.

However, when the frequency of the modulated signal Ms and the driving frequencies of the transistors M1 and M2, which are the oscillation frequencies of self-excited oscillation of the driving signal output circuit 51*a*, are increased, switching loss in the transistors M1 and M2 becomes large. The switching loss caused by such transistors M1 and M2 increases the power consumption in the driving signal output circuit 51*a* and also increases the amount of heat generated in the driving signal output circuit 51*a*. That is, when the driving frequencies of the transistors M1 and M2, which are the oscillation frequencies of self-excited oscillation of the driving signal output circuit 51*a*, are too high, the switching loss in the transistors M1 and M2 becomes large. As a result, an energy saving property and a heat saving property, which are one of superiorities of a class D amplifier over linear amplification such as a class AB amplifier may be impaired. In terms of reducing the switching loss of the transistors M1 and M2, the driving frequencies of the transistors M1 and M2, which are the frequency of the modulated signal Ms and the oscillation frequencies of self-excited oscillation of the driving signal output circuit 51*a*, are preferably 8 MHz or less. Particularly, when it is required to enhance the power saving property of the liquid discharge apparatus 1, the driving frequencies of the transistors M1 and M2 are preferably 4 MHz or less.

As described above, in the driving signal output circuit 51*a* using the class D amplifier, the driving frequencies of the transistors M1 and M2, which are the oscillation frequencies of self-excited oscillation of the driving signal output circuit 51*a*, are preferably 1 MHz or more and 8 MHz or less, in terms of achieving both improved accuracy of the output signal waveform of the driving signal COMA and power saving. Particularly, when power consumption of the liquid discharge apparatus 1 is reduced, the driving frequencies of the transistors M1 and M2, which are the oscillation frequencies of self-excited oscillation of the driving signal output circuit 51*a*, are preferably 1 MHz or more and 4 MHz or less.

Here, the driving frequencies of the transistors M1 and M2, which are the oscillation frequencies of self-excited oscillation of the driving signal output circuit 51*a*, include the frequency of the modulated signal Ms, the frequencies of the gate signals Hgd and Lgd, the frequency of the amplified-modulated signal AMs, and the like which are described above.

As described above, the driving signal output circuit 51*a* that outputs the driving signal COMA includes the integrated circuit 500 including the terminal Hdr that outputs the gate signal Hgd and the terminal Ldr that outputs the gate signal Lgd, and outputting the gate signal Hgd and the gate signal Lgd, the transistor M1 to which the gate signal Hgd is input, the transistor M2 to which the gate signal Lgd is input, and the coil L1 having one end electrically coupled to the transistor M1 and the transistor M2 and the other end electrically coupled to the print head 20. In the transistor M1 of the driving signal output circuit 51*a*, change in whether or not the source terminal and the drain terminal are electrically coupled to each other is made according to the gate signal Hgd input to the gate terminal, and in the transistor M2, change in whether or not the source terminal and the drain terminal are electrically coupled to each other is made according to the gate signal Lgd input to the gate terminal. Further, the source terminal of the transistor M1 and the drain terminal of the transistor M2 are electrically coupled to one end of the coil L1.

Similarly, the driving signal output circuit 51*b* that outputs the driving signal COMB includes the integrated circuit 500 including the terminal Hdr that outputs the gate signal Hgd and the terminal Ldr that outputs the gate signal Lgd, and outputting the gate signal Hgd and the gate signal Lgd, the transistor M1 to which the gate signal Hgd is input, the transistor M2 to which the gate signal Lgd is input, and the coil L1 having one end electrically coupled to the transistor M1 and the transistor M2 and the other end electrically coupled to the print head 20. In the transistor M1 of the driving signal output circuit 51*b*, change in whether or not the source terminal and the drain terminal are electrically coupled to each other is made according to the gate signal Hgd input to the gate terminal, and in the transistor M2, change in whether or not the source terminal and the drain terminal are electrically coupled to each other is made according to the gate signal Lgd input to the gate terminal. Further, the source terminal of the transistor M1 and the drain terminal of the transistor M2 are electrically coupled to one end of the coil L1.

That is, the driving signal output circuit 51*a* in the present embodiment is a class D amplifier circuit, in which the transistor M1 and the transistor M2 constitute the amplifier circuit 550 that amplifies the modulated signal Ms obtained by modulating the reference driving signal dA, which is a digital signal before demodulation, and the coil L1, which is the smoothing circuit 560 that demodulates the amplified-modulated signal AMs output by the amplifier circuit 550, constitutes the low pass filter that outputs the driving signal COMA. Similarly, the driving signal output circuit 51*b* in the present embodiment is a class D amplifier circuit, in which the transistor M1 and the transistor M2 constitute the amplifier circuit 550 that amplifies the modulated signal Ms obtained by modulating the reference driving signal dB, which is a digital signal before demodulation, and the coil L1, which is the smoothing circuit 560 that demodulates the amplified-modulated signal AMs output by the amplifier circuit 550, constitutes the low pass filter that outputs the driving signal COMB.

Here, the gate signal Hgd output by the integrated circuit 500 is an example of a first control signal, and the gate signal Lgd is an example of a second control signal. The transistor M1 to which the gate signal Hgd is input is an example of a first transistor, and the transistor M2 to which the gate signal Lgd is input is an example of a second transistor. Further, in the transistor M1, the gate terminal to which the gate signal Hgd is input is an example of a first terminal, the source terminal is an example of a second terminal, and the drain terminal to which the voltage VHV, which is a high potential voltage defining a high potential of the driving signals COMA and COMB, is supplied is an example of a third terminal. Further, the gate terminal to which the gate signal Lgd of the transistor M2 is input is an example of a fourth terminal, the source terminal to which the ground potential is supplied is an example of a fifth terminal, and the drain terminal coupled to the drain terminal of the transistor M1 is an example of a sixth terminal. The amplifier circuit 550 including the transistor M1 and the transistor M2 is an example of a digital amplification section that amplifies the modulated signal Ms which is a digital signal based on the reference driving signals dA and dB.

6. Structure of Driving Circuit Substrate Mounted with Driving Signal Output Circuit Next, structures of the driving signal output circuits 51*a* and 51*b* will be described. In the liquid discharge apparatus 1 in the present embodiment, the transistors M1 and M2 that generate particularly large heat and capable of a heat generation source of the noise due to the switching operation are optimally disposed, such that the number of piezoelectric elements 60 driven by the driving signals COMA and COMB output by the driving signal output circuits 51*a* and 51*b* is increased to be 5000 or more. Therefore, even when a current output by the driving signal output circuits 51*a* and 51*b* are increased, the heat generation of the transistors M1 and M2 are reduced and the improvement of operational stability of the driving signal output circuits 51*a* and 51*b* are realized, and accordingly, the waveform accuracy of the driving signals COMA and COMB output by the driving signal output circuits 51*a* and 51*b* are improved.

Therefore, to explain the structures of the driving signal output circuits 51*a* and 51*b*, first, structures of the transistors M1 and M2 used in the driving signal output circuits 51*a* and 51*b* in the present embodiment will be described. The transistors M1 and M2 have the same structure. In the following description, when it is not necessary to distinguish the transistors M1 and M2, they may be simply referred to as a transistor M. Further, in the following description, a surface of the transistor M on which a terminal is provided may be referred to as a terminal surface, the terminal being electrically coupled to a wiring substrate 55 which will be described later, a case in which the transistor M is viewed from the terminal surface side may be referred to as a bottom view, and a case in which the transistor M is viewed from a side opposite to the terminal surface side may be referred to as a plan view.

Figure 11:
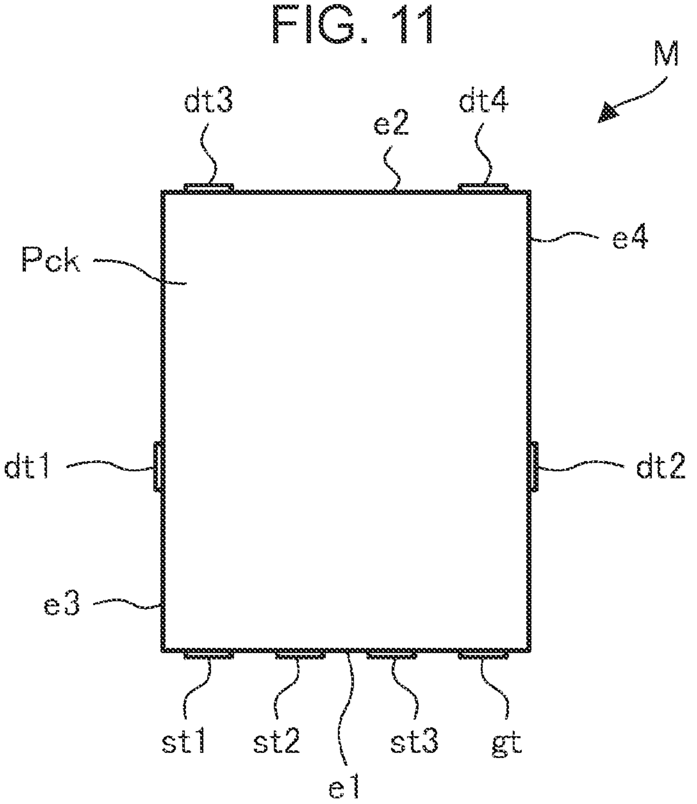
FIG. 11 is a view illustrating a transistor when viewed in a plan view.
Figure 12:
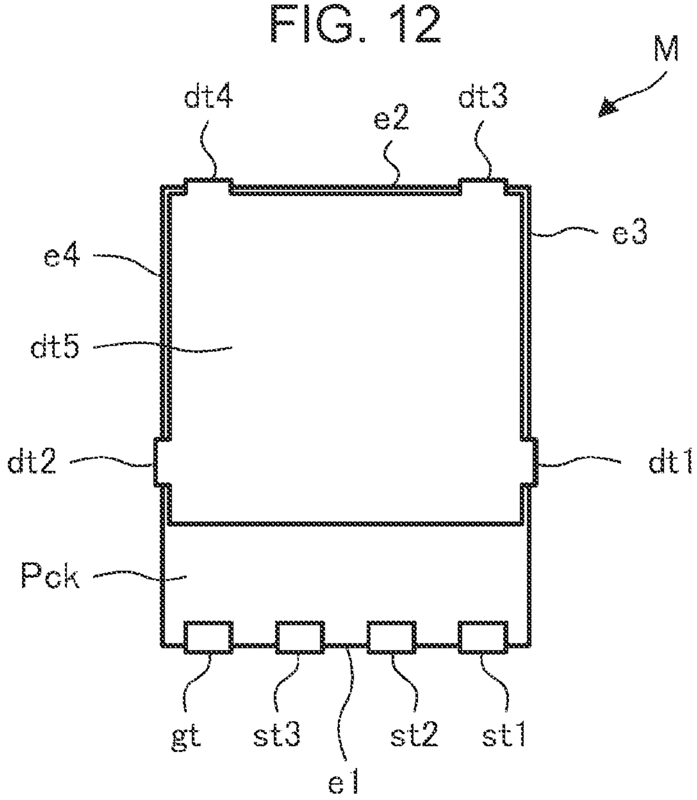
FIG. 12 is a view illustrating the transistor when viewed in a bottom view.

FIG. 11 is a view illustrating the transistor M when viewed in a plan view, and FIG. 12 is a view illustrating the transistor M when viewed in a bottom view. As illustrated in FIGS. 11 and 12, the transistor M has a substantially rectangular parallelepiped housing Pck and a plurality of terminals provided around the housing Pck.

As illustrated in FIGS. 11 and 12, the housing Pck includes sides e1 and e2 located to face each other, and sides e3 and e4 located to intersect both the sides e1 and e2 and face each other. That is, a shape of the transistor M has a substantially rectangular parallelepiped shape. The housing Pck is formed of, for example, a resin mold member, and a semiconductor chip (not illustrated) containing silicon or the like forming a transistor element is provided inside the housing Pck.

A terminal gt and terminals st1 to st3 among the plurality of terminals are arranged side by side on the side e1 of the housing Pck. The terminal gt is electrically coupled to a gate of the transistor element provided inside the housing Pck, and the terminals st1 to st3 are electrically coupled to a source of the transistor element provided inside the housing Pck. That is, the terminal gt corresponds to the gate terminal of the transistor M, and each of the terminals st1 to st3 corresponds to the source terminal of the transistor M.

The terminal gt and the terminals st1, st2, and st3 are located in the order of the terminal st1, the terminal st2, the terminal st3, and the terminal gt in a direction from the side e3 to the side e4 along the side e1. In other words, the terminal gt and the terminals st1, st2, and st3 are located side by side along the side e1 of the housing Pck, and the terminal gt is located closest to the side e4 of the housing Pck. That is, the terminal gt that corresponds to the gate terminal electrically coupled to a gate of a semiconductor chip provided inside the housing Pck is located at a corner of the transistor M.

In the housing Pck, terminals dt3 and dt4 are located on the side e2 different from the side e1, a terminal dt1 is located on the side e3 different from the side e1, and a terminal dt2 is located on the side e4 different from the side e1. Each of the terminals dt1, dt2, dt3, and dt4 is electrically coupled to the drain of the transistor element provided inside the housing Pck. That is, the terminals dt1, dt2, dt3, and dt4 correspond to the drain terminals of the transistor M. As illustrated in FIG. 12, the terminals dt1, dt2, dt3, and dt4 are commonly coupled by a terminal dt5 provided on the terminal surface of the transistor M. As a result, the total area of the drain terminal in the transistor M can be increased.

As described above, in the transistor M, the terminal gt corresponding to the gate terminal and the terminals st1, st2, and st3 corresponding to the source terminal are located side by side along the side e1, and the terminals dt1, dt2, dt3, and dt4 corresponding to the drain terminal are located along the sides e2, e3, and e4 different from the side e1. The terminals dt1, dt2, dt3, and dt4 are commonly coupled by the terminal dt5 provided on the terminal surface.

Further, in the transistor M, the terminal gt, the terminals st1, st2, and st3 and the terminals dt1, dt2, dt3, dt4, and dt5 which are provided on the terminal surface and arranged side by side along the side surfaces are coupled to the wiring substrate 55, which will be described later, by soldering or the like. That is, the transistor M in the present embodiment is a so-called surface-mount type flat non-lead package in which the terminal gt, the terminals st1, st2, and st3, and the terminals dt1, dt2, dt3, and dt4 are provided on the terminal surface of the transistor M and arranged side by side along the side surfaces.

In such a transistor M, the terminals dt1, dt2, dt3, dt4, and dt5 are preferably a so-called exposed die pad in which each of the terminals dt1, dt2, dt3, dt4, and dt5 and the transistor element provided inside the housing Pck are directly coupled to each other without being electrically insulated. As a result, a resistance component between the transistor element provided inside the housing Pck and the terminals dt1, dt2, dt3, dt4, and dt5 can be reduced, and the heat generation in the transistor M can be reduced. Further, in the transistor M, the terminal gt and the terminals st1, st2, and st3 may be also an exposed die pad like the terminals dt1, dt2, dt3, dt4, and dt5. However, considering that the flowing current and supplied voltage of the terminal gt and the terminals st1, st2, and st3 are smaller than those of the terminals dt1, dt2, dt3, dt4, and dt5, the terminal gt and the terminals st1, st2, and st3 in the transistor M may be a so-called lead die pad in which the terminal gt and the terminals st1, st2, and st3 are electrically insulated from the transistor element provided inside the housing Pck and coupled by wire bonding in terms of increasing a degree of freedom in disposing the terminal gt and the terminals st1, st2, and st3.

Here, the side e1 is an example of the first side, and at least one of the sides e2, e3, and e4 is an example of the second side. Further, in the transistor M1, the terminal gt corresponding to the gate terminal is also an example of the first terminal, and the terminals st1, st2, and st3 corresponding to the source terminal are also examples of the second terminal, and the terminals dt1, dt2, dt3, dt4, and dt5 corresponding to the drain terminal are also examples of the third terminal. Similarly, in the transistor M2, the terminal gt corresponding to the gate terminal is also an example of the fourth terminal, and the terminals st1, st2, and st3 corresponding to the source terminal are also an example of the fifth terminal, and the terminals dt1, dt2, dt3, dt4, and dt5 corresponding to the drain terminal are an example of the sixth terminal.

Next, the structures of the driving signal output circuits 51*a* and 51*b* including the transistors M1 and M2 having the above-described structure will be described. The driving signal output circuits 51*a* and 51*b* have the same structure. In the following description, only the structure of the driving signal output circuit 51*a* will be described, and the description of the structure of the driving signal output circuit 51*b* will be omitted.

Figure 13:
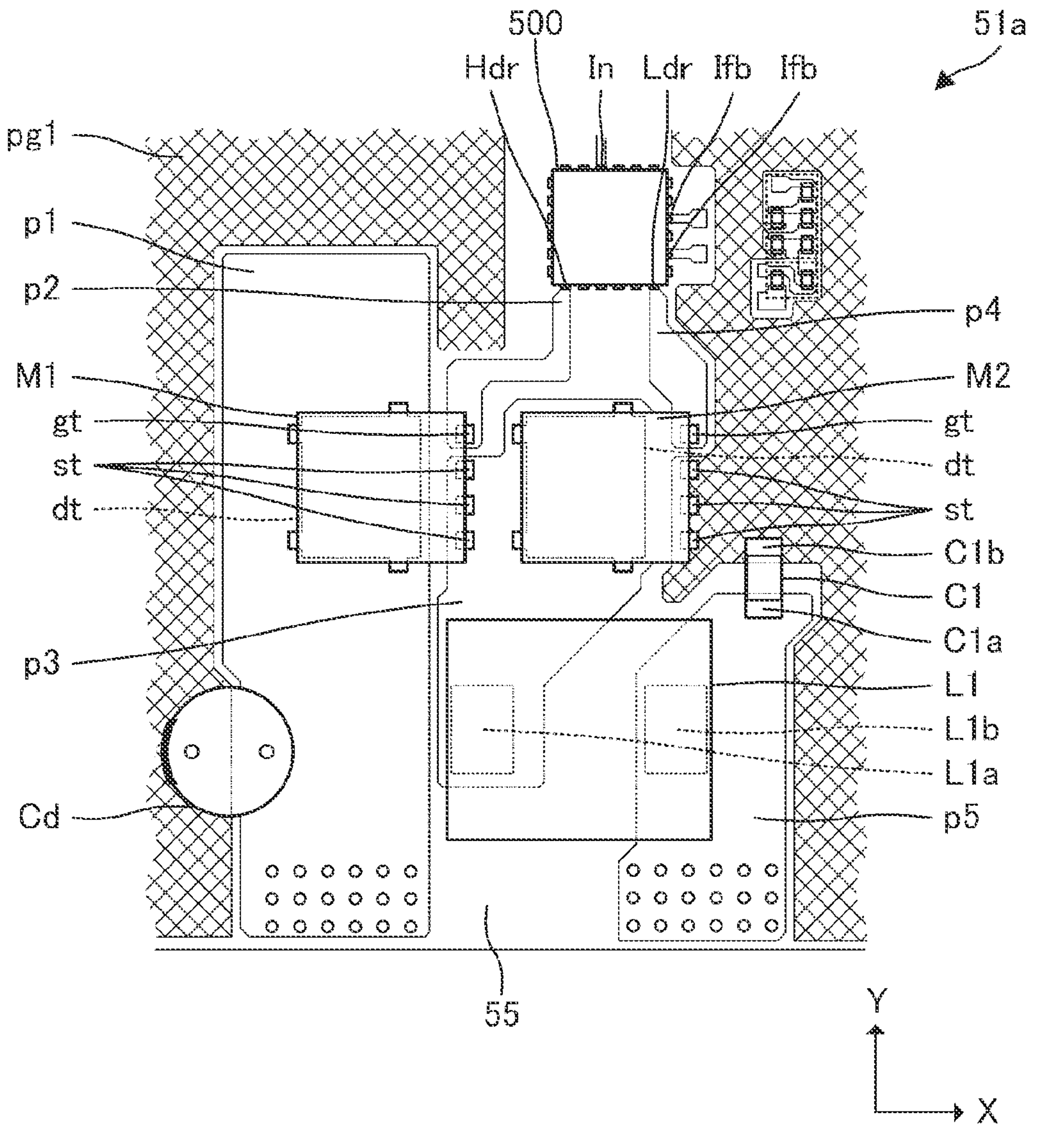
FIG. 13 is a view for describing a structure of the driving signal output circuit.

FIG. 13 is a view for describing the structure of the driving signal output circuit 51*a*. Here, in FIG. 13, the X direction and the Y direction, which are orthogonal to each other, will be used for description. When a direction of the X direction is defined, an arrow starting point side illustrated in FIG. 13 may be referred to as −X side, a tip end side may be referred to as +X side. Similarly, when a direction of the Y direction is defined, an arrow starting point side illustrated in FIG. 13 may be referred to as −Y side, a tip end side may be referred to as +Y side.

FIG. 13 simply illustrates the terminals st1 to st3 corresponding to the source terminals of the transistors M1 and M2 as a terminal st, and the terminals dt1 to dt5 corresponding to the drain terminal as a terminal dt. Further, some circuit elements constituting the driving signal output circuit 51*a* are omitted in FIG. 13.

As illustrated in FIG. 13, the driving signal output circuit 51*a* includes the integrated circuit 500, the transistors M1 and M2, the coil L1, and the wiring substrate 55. The integrated circuit 500, the transistors M1 and M2, and the coil L1 included in the driving signal output circuit 51*a* are provided on the wiring substrate 55. Such a wiring substrate 55 has a wiring pattern for electrically coupling various circuit elements including the integrated circuit 500, the transistors M1 and M2, and the coil L1. FIG. 13 illustrates only a surface layer on which the integrated circuit 500, the transistors M1 and M2, and the coil L1 are mounted in the wiring substrate 55, but the wiring substrate 55 may be a so-called multilayer substrate including a plurality of wiring layers formed therein. Here, the wiring substrate 55 is an example of a substrate.

The transistor M1 and the transistor M2 are arranged side by side along the X direction so that the terminal gt and the terminal st are on the +X side.

Specifically, the side e1 on which the terminal gt and the terminal st of the transistor M1 are located extends along the Y direction so that the terminal gt provided along the side e1 is on the +Y side and the terminal st is on the −Y side, and the side e2 on which the terminal dt is located extends along the Y direction in the −X side of the side e1. That is, the transistor M1 is provided on the wiring substrate 55 so that the side e1 is on the +X side, the side e2 is on the −X side, the side e3 is on the +Y side, and the side e4 is on the −Y side.

Further, the transistor M2 is located on the +X side of the transistor M1. The side e1 on which the terminal gt and the terminal st of the transistor M2 are located extends along the Y direction so that the terminal gt provided along the side e1 is on the +Y side and the terminal st is on the −Y side, and the side e2 on which the terminal dt is located extends along the Y direction in the −X side of the side e1. That is, the transistor M2 is provided on the wiring substrate 55 so that the side e1 is on the +X side, the side e2 is on the −X side, the side e3 is on the +Y side, and the side e4 is on the −Y side, on the +X side of the transistor M1.

Therefore, in the driving signal output circuit 51*a* of the present embodiment, the terminal st of the transistor M1 and the terminal dt of the transistor M2 are located to face each other along the X direction, and the transistors M1 and M2 are located so that the terminal gt and the terminal dt of the transistor M1 and the terminal gt and the terminal st of the transistor M2 are not located between the terminal st of the transistor M1 and the terminal dt of the transistor M2.

Here, as illustrated in FIGS. 11 and 12, the number of terminal gt of the transistor M1 is smaller than the number of terminals st, and the number of terminals st of the transistor M1 is smaller than the number of terminals dt. That is, the total area of the terminal gt corresponding to the gate terminal of the transistor M1 is smaller than that of the terminal st corresponding to the source terminal, and the total area of the terminal st corresponding to the source terminal is smaller than that of the terminal dt corresponding to the drain terminal. Thus, when the transistor M1 is provided on the wiring substrate 55 as illustrated in FIG. 13, the total area of a contact portion where the terminal gt and the wiring substrate 55 are in contact with each other and are electrically coupled by soldering or the like is smaller than that of a contact portion where the terminal st and the wiring substrate 55 are in contact with each other and are electrically coupled by soldering or the like. In addition, the total area of the contact portion where the terminal st and the wiring substrate 55 are in contact with and are electrically coupled by soldering or the like is smaller than that of a contact portion where the terminal dt and the wiring substrate 55 are in contact with each other and are electrically coupled by soldering or the like.

Here, the contact portion where the terminal gt of the transistor M1 and the wiring substrate 55 are in contact with each other includes a region where the terminal gt and the wiring substrate 55 can are in contact with each other, and for example, when the transistor M1 is mounted on the wiring substrate 55, the contact portion corresponds to a pad portion of the wiring substrate 55 to which the terminal gt is fixed. Similarly, the contact portion where the terminal st of the transistor M1 and the wiring substrate 55 are in contact with each other includes a region where the terminal st and the wiring substrate 55 can are in contact with each other, and for example, when the transistor M1 is mounted on the wiring substrate 55, the contact portion corresponds to a pad portion of the wiring substrate 55 to which the terminal st is fixed. In addition, the contact portion where the terminal dt of the transistor M1 and the wiring substrate 55 are in contact with each other includes a region where the terminal dt and the wiring substrate 55 can are in contact with each other, and for example, when the transistor M1 is mounted on the wiring substrate 55, the contact portion corresponds to a pad portion of the wiring substrate 55 to which the terminal dt is fixed.

Therefore, the total area of the contact portion where the terminal gt of the transistor M1 and the wiring substrate 55 are in contact with each other includes the total area of the pad portion where the terminal gt of the transistor M1 is fixed to the wiring substrate 55, and similarly, the total area of the contact portion where the terminal st of the transistor M1 and the wiring substrate 55 are in contact with each other includes the total area of the pad portion where the terminal st of the transistor M1 is fixed to the wiring substrate 55, and the total area of the contact portion where the terminal dt of the transistor M1 and the wiring substrate 55 are in contact with each other includes the total area of the pad portion where the terminal dt of the transistor M1 is fixed to the wiring substrate 55.

Here, the pad portion of the wiring substrate 55 in which the terminal gt of the transistor M1 is in contact with the wiring substrate 55 is an example of a first contact portion, and the pad portion of the wiring substrate 55 in which the terminal st of the transistor M1 is in contact with the wiring substrate 55 is an example of a second contact portion, and the pad portion of the wiring substrate 55 in which the terminal dt of the transistor M1 is in contact with the wiring substrate 55 is an example of a third contact portion.

As illustrated in FIGS. 11 and 12, the number of terminal gt of the transistor M2 is smaller than the number of terminals st, and the number of terminals st of the transistor M2 is smaller than the number of terminals dt. That is, the total area of the terminal gt corresponding to the gate terminal of the transistor M2 is smaller than that of the terminal st corresponding to the source terminal, and the total area of the terminal st corresponding to the source terminal is smaller than that of the terminal dt corresponding to the drain terminal. Thus, when the transistor M2 is provided on the wiring substrate 55 as illustrated in FIG. 13, the total area of a contact portion where the terminal gt and the wiring substrate 55 are in contact with each other and are electrically coupled by soldering or the like is smaller than that of a contact portion where the terminal st and the wiring substrate 55 are in contact with each other and are electrically coupled by soldering or the like. In addition, the total area of the contact portion where the terminal st and the wiring substrate 55 are in contact with and are electrically coupled by soldering or the like is smaller than that of a contact portion where the terminal dt and the wiring substrate 55 are in contact with each other and are electrically coupled by soldering or the like.

Here, the contact portion where the terminal gt of the transistor M2 and the wiring substrate 55 are in contact with each other includes a region where the terminal gt and the wiring substrate 55 can are in contact with each other, and for example, when the transistor M2 is mounted on the wiring substrate 55, the contact portion corresponds to a pad portion of the wiring substrate 55 to which the terminal gt is fixed. Similarly, the contact portion where the terminal st of the transistor M2 and the wiring substrate 55 are in contact with each other includes a region where the terminal st and the wiring substrate 55 can are in contact with each other, and for example, when the transistor M2 is mounted on the wiring substrate 55, the contact portion corresponds to a pad portion of the wiring substrate 55 to which the terminal st is fixed. In addition, the contact portion where the terminal dt of the transistor M2 and the wiring substrate 55 are in contact with each other includes a region where the terminal dt and the wiring substrate 55 can are in contact with each other, and for example, when the transistor M2 is mounted on the wiring substrate 55, the contact portion corresponds to a pad portion of the wiring substrate 55 to which the terminal dt is fixed.

Therefore, the total area of the contact portion where the terminal gt of the transistor M2 and the wiring substrate 55 are in contact with each other includes the total area of the pad portion where the terminal gt of the transistor M2 is fixed to the wiring substrate 55, and similarly, the total area of the contact portion where the terminal st of the transistor M2 and the wiring substrate 55 are in contact with each other includes the total area of the pad portion where the terminal st of the transistor M2 is fixed to the wiring substrate 55, and the total area of the contact portion where the terminal dt of the transistor M2 and the wiring substrate 55 are in contact with each other includes the total area of the pad portion where the terminal dt of the transistor M2 is fixed to the wiring substrate 55.

In the liquid discharge apparatus 1 of the present embodiment, the terminal dt and the terminal st of each of the transistors M1 and M2 have a larger current flowing therethrough than the terminal gt of each of the transistors M1 and M2. The total area of the pad portion where the terminal dt and the terminal st of each of the transistors M1 and M2 and the wiring substrate 55 are in contact with each other, which is the total area of the terminal dt and the terminal st of each of the transistors M1 and M2 through which such a large current flows, is larger than the total area of the pad portion where the terminal gt of each of the transistors M1 and M2 and the wiring substrate 55 are in contact with each other, which is the total area of the terminal gt of each of the transistors M1 and M2, such that it is possible to reduce a contact resistance between the terminal dt and the terminal st of each of the transistors M1 and M2 and the wiring substrate 55. As a result, it is possible to reduce heat generated due to the large current flowing through the transistors M1 and M2.

Furthermore, the terminal dt of each of the transistors M1 and M2 has a higher voltage being supplied thereto than the terminal st of each of the transistors M1 and M2. The total area of the pad portion where the terminal dt of each of the transistors M1 and M2 and the wiring substrate 55 are in contact with each other, which is the total area of the terminal dt of each of the transistors M1 and M2 where such a high voltage is applied, is larger than the total area of the pad portion where the terminal st of each of the transistors M1 and M2 and the wiring substrate 55 are in contact with each other, which is the total area of the terminal st of each of the transistors M1 and M2, such that it is possible to reduce a contact resistance between the terminal dt of each of the transistors M1 and M2 and the wiring substrate 55. As a result, it is possible to reduce contact loss caused by the transistors M1 and M2 provided on the wiring substrate 55.

As illustrated in FIG. 13, the integrated circuit 500 is located on the +Y side of the transistors M1 and M2 arranged side by side in the X direction. That is, the integrated circuit 500 is located closer to the terminal gt than the terminal st of the terminal gt and the terminal st arranged side by side along the side e1 extending in the Y direction of the transistor M1, and located closer to the terminal gt than the terminal st of the terminal gt and the terminal st arranged side by side along the side e1 extending in the Y direction of the transistor M2. That is, the integrated circuit 500 and the transistor M1 are provided with the wiring substrate 55 so that the shortest distance between the terminal Hdr of the integrated circuit 500 and the terminal gt of the transistor M1 is shorter than the shortest distance between the terminal Hdr of the integrated circuit 500 and the terminal st of the transistor M1, and the integrated circuit 500 and the transistor M2 are provided with the wiring substrate 55 so that the shortest distance between the terminal Ldr of the integrated circuit 500 and the terminal gt of the transistor M1 is shorter than the shortest distance between the terminal Ldr of the integrated circuit 500 and the terminal st of the transistor M1.

As a result, it is possible to shorten a wiring length of a wiring pattern p2 through which the gate signal Hgd output from the terminal Hdr of the integrated circuit 500 and input to the terminal gt of the transistor M1 propagates, and a wiring length of a wiring pattern p4 through which the gate signal Lgd output from the terminal Ldr of the integrated circuit 500 and input to the terminal gt of the transistor M2 propagates.

The gate signals Hgd and Lgd output by the integrated circuit 500 are signals having a small change in logic level as compared with the amplified-modulated signals AMs output by the transistors M1 and M2. When a signal with the logic level and high amplitude in the amplified-modulated signal AMs interferes with the gate signals Hgd and Lgd which are the signals having a small change in logic level, malfunction occurs in the transistors M1 and M2, and as a result, distortion occurs in waveforms of the amplified-modulated signal AMs and the driving signal COMA based on the amplified-modulated signal AMs. That is, the operational stability of the driving signal output circuit 51*a* is reduced, and the waveform accuracy of the driving signal COMA is reduced.

To solve such a problem, by shortening the wiring length of the wiring pattern p2 through which the gate signal Hgd output from the terminal Hdr of the integrated circuit 500 and input to the terminal gt of the transistor M1 propagates, and the wiring length of the wiring pattern p4 through which the gate signal Lgd output from the terminal Ldr of the integrated circuit 500 and input to the terminal gt of the transistor M2 propagates, the possibility of interference with the signal with the high amplitude and logic level in the gate signals Hgd and Lgd is reduced. As a result, the operational stability of the driving signal output circuit 51*a* is improved, and the waveform accuracy of the driving signal COMA output by the driving signal output circuit 51*a* is improved.

In this case, the wiring pattern p2 that couples the terminal Hdr of the integrated circuit 500 and the terminal gt as the gate terminal of the transistor M1 to each other and the wiring pattern p4 that couples the terminal Ldr of the integrated circuit 500 and the terminal gt as the gate terminal of the transistor M2 are provided on a surface or the same surface of the wiring substrate 55 on which the integrated circuit 500 and the transistors M1 and M2 are provided. That is, the integrated circuit 500, the transistor M1, and the wiring pattern p2 are provided on the same wiring layer of the wiring substrate 55, and the integrated circuit 500, the transistor M2, and the wiring pattern p4 are provided on the same wiring layer of the wiring substrate 55.

As a result, it is not necessary to provide vias or the like in the wiring pattern p2 through which the gate signal Hgd propagates and the wiring pattern p4 through which the gate signal Lgd propagates, and thus the possibility that a noise or the like interferes with the gate signals Hgd and Lgd is further reduced. As a result, the operational stability of the driving signal output circuit 51*a* is further improved, and the waveform accuracy of the driving signal COMA output by the driving signal output circuit 51*a* is further improved.

Furthermore, the integrated circuit 500, the transistors M1 and M2, and the wiring substrate 55 are provided so that the shortest distance between the terminal gt as the gate terminal of the transistor M1 and the terminal Hdr of the integrated circuit 500 that outputs the gate signal Hgd input to the terminal gt of the transistor M1 is longer than the shortest distance between the terminal gt as the gate terminal of the transistor M2 and the terminal Ldr of the integrated circuit 500 that outputs the gate signal Lgd input to the terminal gt of the transistor M2. As a result, the wiring length of the wiring pattern p4 through which the gate signal Lgd input to the terminal gt of the transistor M2 propagates can be shorter than that of the wiring pattern p2 through which the gate signal Hgd input to the terminal gt of the transistor M1 propagates.

As described above, the voltage VHV, which is a high DC voltage, is supplied to the terminal dt of the transistor M1, and the ground potential is supplied to the terminal st of the transistor M2. Then, each of the transistors M1 and M2 is driven by the input gate signals Hgd and Lgd, and the amplified-modulated signal AMs of which the voltage value changes between the voltage VHV and the ground potential is thus output at a middle point where the terminal st as the source terminal of the transistor M1 and the terminal dt as the drain terminal of the transistor M2 are coupled to each other. That is, the transistor M2 is controlled by the gate signal Lgd having a lower potential than the transistor M1 and outputs a signal having a lower potential.

Such a low-potential gate signal Lgd is more susceptible to wiring impedance and noise than a high-potential gate signal Hgd. In the driving signal output circuit 51*a* of the present embodiment, by making the wiring length of the wiring pattern p4 through which the gate signal Lgd input to the terminal gt of the transistor M2 propagates shorter than that of the wiring pattern p2 through which the gate signal Hgd input to the terminal gt of the transistor M1 propagates, the possibility that the noise is superposed on the wiring pattern p4 through which the gate signal Lgd propagates is further reduced, and an influence of the wiring impedance of the wiring pattern p4 on the gate signal Lgd is reduced. Therefore, the possibility that an abnormality occurs in the logic level of the gate signal Lgd is reduced, and the possibility that the transistor M2 driven by the gate signal Lgd malfunctions is further reduced. As a result, the operational stability of the driving signal output circuit 51*a* is further improved.

Here, the resistor R1 provided between the terminal Hdr illustrated in FIG. 10 and the terminal dt of the transistor M1 and the resistor R2 provided between the terminal Ldr and the terminal dt of the transistor M2 are not illustrated in FIG. 13. That is, the wiring pattern p2 that couples the terminal Hdr and the terminal dt of the transistor M1 to each other may include the resistor R1, and the wiring pattern p4 that couples the terminal Ldr and the terminal dt of the transistor M2 to each other may include the resistor R2. Considering that the resistors R1 and R2 are resistors that limit the current supplied to the transistors M1 and M2, the driving signal output circuit 51*a* may not include the resistors R1 and R2.

As illustrated in FIG. 13, the coil L1 is located on the –Y side of the transistors M1 and M2 arranged side by side in the X direction. That is, the integrated circuit 500, the transistors M1 and M2, and the coil L1 are arranged on the wiring substrate 55 in the order of the integrated circuit 500, the transistors M1 and M2, and the coil L1 along the Y direction. In addition, the coil L1 is provided on the wiring substrate 55 so that a terminal L1*a*, which is one end to which the amplified-modulated signal AMs output from the transistors M1 and M2 is input, is located on the –X side, and a terminal L1*b*, which is the other end from which the driving signal COMA obtained by demodulating the amplified-modulated signal AMs is output, is located on the +X side.

In this case, the coil L1 is provided on the wiring substrate 55 so that the terminal L1*a* is close to the terminal st of the transistor M1 that outputs the amplified-modulated signal AMs and the terminal dt of the transistor M2. In other words, the shortest distance between the terminal st of the transistor M1 and the terminal L1*a* as one end of the coil L1 is shorter than the shortest distance between the terminal dt of the transistor M1 and the terminal L1*a*, and the shortest distance between the terminal dt of the transistor M2 and the terminal L1*a* as one end of the coil L1 is shorter than that between the terminal st of the transistor M2 and the terminal L1*a*. In addition, the coil L1 is provided on the wiring substrate 55 so that the shortest distance between the terminal dt of the transistor M1 and the coil L1 is longer than that between the terminal dt of the transistor M2 and the coil L1. As a result, a wiring length of a wiring pattern p3 through which the amplified-modulated signal AMs with high amplitude, high frequency, and high potential propagates can be shortened.

Since the amplified-modulated signal AMs is high-amplitude, high-frequency, and high-potential signals, it may be a noise source in the driving signal output circuit 51*a*, and as a result, may interfere with various signals propagated in the driving signal output circuit 51*a*. By shortening the wiring length of the wiring pattern p3 through which the amplified-modulated signal AMs, which is the high-amplitude, high-frequency, and high-potential signals, propagates, the possibility that the amplified-modulated signal AMs interferes with various signals propagated in the driving signal output circuit 51*a* is reduced. As a result, the possibility of reducing the operational stability of the driving signal output circuit 51*a* is reduced.

As illustrated in FIG. 13, the capacitor C1 is located on the +X side of the coil L1 and the transistors M1 and M2 arranged side by side in the X direction. Further, the capacitor Cd is located on the –X side of the coil L1.

The driving signal output circuit 51*a* configured as such is supplied with the voltage VHV to a wiring pattern p1. The wiring pattern p1 is electrically coupled to the + side terminal of the capacitor Cd, which is an electrolytic capacitor, and the terminal dt of the transistor M1. Further, the terminal gt of the transistor M1 is electrically coupled to the terminal Hdr of the integrated circuit 500 via the wiring pattern p2, and the terminal st of the transistor M1 is electrically coupled to the wiring pattern p3. Change of such a transistor M1 is made whether or not the terminal dt and the terminal st are electrically coupled to each other is made according to the gate signal Hgd input via the wiring pattern p2. As a result, the transistor M1 switches whether or not to supply the voltage VHV to the wiring pattern p3.

The terminal dt of the transistor M2 is electrically coupled to the wiring pattern p3. Further, the terminal gt of the transistor M2 is electrically coupled to the terminal Ldr of the integrated circuit 500 via the wiring pattern p4, and the terminal st of the transistor M2 is electrically coupled to a wiring pattern pg1 to which the ground potential is supplied. Change of such a transistor M2 is made whether or not the terminal dt and the terminal st are electrically coupled to each other is made according to the gate signal Lgd input via the wiring pattern p4, and thus the transistor M2 switches whether or not the potential of the wiring pattern p3 is the ground potential. As described above, since the terminal st of the transistor M1 and the terminal dt of the transistor M2 are electrically coupled to the wiring pattern p3, the amplified-modulated signal AMs of which the voltage value changes between the voltage VHV and the ground potential is output to the wiring pattern p3.

Further, the terminal L1*a*, which is one end of the coil L1, is electrically coupled to the wiring pattern p3. The terminal L1*b*, which is the other end of the coil L1, is electrically coupled to a wiring pattern p5. A terminal C1*a*, which is one end of the capacitor C1, is coupled to the wiring pattern p5. A terminal C1*b*, which is the other end of the capacitor C1, is electrically coupled to the wiring pattern pg1 to which the ground potential is supplied. As a result, the coil L1 and the capacitor C1 constitute a low pass filter, and the driving signal COMA obtained by demodulating the amplified-modulated signal AMs is output to the wiring pattern p5.

Here, the driving signal output circuit 51*b* of the driving circuit 50 may be provided on the wiring substrate 55 together with the driving signal output circuit 51*a*, or may be provided on a substrate different from the wiring substrate 55.

7. Operational Effect

In each of the driving signal output circuits 51*a* and 51*b* for outputting the driving signals COMA and COMB for driving the piezoelectric element 60 in the liquid discharge apparatus 1 of the present embodiment, the shortest distance between the terminal st of the transistor M1 and the terminal L1*a* which is one end of the coil L1 is shorter than the shortest distance between the terminal dt of the transistor M1 and the terminal L1*a* which is one end of the coil L1, in addition, the shortest distance between the terminal dt of the transistor M2 and the terminal L1*a* which is one end of the coil L1 is shorter than the shortest distance between the terminal st of the transistor M2 and the terminal L1*a* which is one end of the coil L1, such that the transistor M1 and the transistor M2 can be coupled to each other, and the wiring length of the wiring pattern p3 through which the amplified-modulated signal AMs is output can be shortened. Since the amplified-modulated signal AMs is a signal whose potential fluctuates at a high frequency between a high potential based on the voltage VHV and a ground potential, it may become a noise source in the driving signal output circuit. In the liquid discharge apparatus 1 of the present embodiment, the wiring length of the wiring pattern p3 through which the amplified-modulated signal AMs that may be such a noise source propagates is shortened, such that the possibility that the operational stability of the driving signal output circuits 51*a* and 51*b* is impaired due to the noise caused by the fluctuation of the potential of the amplified-modulated signal AMs is reduced, and the waveform accuracy of the driving signals COMA and COMB output by the driving signal output circuits 51*a* and 51*b* is improved.

In the liquid discharge apparatus 1 of the present embodiment, even when the number of piezoelectric elements 60 driven by the driving signals COMA and COMB output by the driving signal output circuits 51*a* and 51*b* increases, the possibility that the operational stability of the driving signal output circuits 51*a* and 51*b* is impaired due to the noise caused by the fluctuation of the potential of the amplified-modulated signal AMs is reduced. Therefore, the operational stability of the driving signal output circuits 51*a* and 51*b* can be maintained, and the waveform accuracy of the driving signals COMA and COMB output by the driving signal output circuits 51*a* and 51*b* can be improved. Therefore, even when the number of piezoelectric elements 60 driven by the driving signals COMA and COMB output by the driving signal output circuits 51*a* and 51*b* is 5000 or more, or even when the liquid discharge apparatus 1 is a line-type ink jet printer including a line head that discharges ink to the medium P of A4 size or more, the operational stability of the driving signal output circuits 51*a* and 51*b* can be improved, and the waveform accuracy of the driving signals COMA and COMB output by the driving signal output circuits 51*a* and 51*b* can be improved.

The embodiment has been described above, but the present disclosure is not limited to the embodiments and the modification examples, and can be implemented in various aspects without departing from the gist thereof. For example, the above embodiment can be combined as appropriate.

The present disclosure includes substantially the same configurations (for example, configurations having the same functions, methods, and results, or configurations having the same objects and effects) as the configurations described in the embodiment. Further, the present disclosure includes configurations in which non-essential parts of the configuration described in the embodiment are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiment.

The following contents are derived from the above-described embodiment.

An aspect of the liquid discharge apparatus includes a discharge head that includes a piezoelectric element and discharges a liquid by driving the piezoelectric element; and a driving signal output circuit that outputs a driving signal for driving the piezoelectric element, in which the driving signal output circuit includes an integrated circuit that outputs a first control signal and a second control signal, a first transistor to which the first control signal is input, a second transistor to which the second control signal is input, a coil that has one end electrically coupled to the first transistor and the second transistor, and the other end electrically coupled to the discharge head, and a substrate, the integrated circuit, the first transistor, the second transistor, and the coil are provided on the substrate, the first transistor is a surface-mount type flat non-lead package, and in the first transistor, change in whether or not a second terminal and a third terminal are electrically coupled to each other is made according to the first control signal input to a first terminal, the second transistor is a surface-mount type flat non-lead package, and in the first transistor, change in whether or not a fifth terminal and a sixth terminal are electrically coupled to each other is made according to the second control signal input to a fourth terminal, the coil is electrically coupled to the second terminal and the sixth terminal, a shortest distance between the second terminal and the one end of the coil is shorter than that between the third terminal and the one end of the coil, and a shortest distance between the sixth terminal and the one end of the coil is shorter than that between the fifth terminal and the one end of the coil.

According to the liquid discharge apparatus, the driving signal output circuit that outputs the driving signal for driving the piezoelectric element includes the first transistor in which the first control signal output from the first output terminal by the integrated circuit is input to the first terminal and of which change is made whether or not the second terminal and the third terminal are electrically coupled to each other is made according to the first control signal input to the first terminal, and the second transistor in which the second control signal output from the second output terminal by the integrated circuit is input to the fourth terminal and of which change is made whether or not the fifth terminal and the sixth terminal are electrically coupled to each other is made according to the second control signal input to the fourth terminal. In this case, the coil is electrically coupled to the second terminal and the sixth terminal, and the first transistor and the second transistor are located so that the shortest distance between the second terminal and one end of the coil is shorter than that between the third terminal and one end of the coil, and the shortest distance between the sixth terminal and one end of the coil is shorter than that between the fifth terminal and one end of the coil. As a result, it is possible to shorten the length of wiring through which the signal output to the coil propagates from a coupling point where the second terminal of the first transistor and the sixth terminal of the second transistor are electrically coupled to each other. As a result, the possibility that the noise caused by the signal output to the coil from the coupling point where the second terminal of the first transistor and the sixth terminal of the second transistor are electrically coupled to each other affects various circuits of the driving signal output circuit is reduced. Therefore, the operation of the driving signal output circuit is stabilized, and the waveform accuracy of the driving signal output by the driving signal output circuit is improved.

In the aspect of the liquid discharge apparatus, the driving signal output circuit may include a class D amplifier circuit, the first transistor and the second transistor may constitute a digital amplification section that amplifies a digital signal before demodulation, and the coil may constitute a low pass filter that demodulates output of the digital amplification section and outputs the driving signal.

According to the liquid discharge apparatus, the driving signal output circuit is used as the class D amplifier circuit in which the first transistor and the second transistor constitute the digital amplification section and the coil constitutes the low pass filter that outputs the driving signal, such that it is possible to reduce power consumption of the driving signal output circuit.

In the aspect of the liquid discharge apparatus, a driving frequency of the first transistor may be 1 MHz or more and 8 MHz or less.

According to the liquid discharge apparatus, the driving frequency of the first transistor of driving signal output circuit is 1 MHz or more and 8 MHz or less, such that it is possible to reduce power consumption and heat generation of the driving signal output circuit while improving the waveform accuracy of the driving signal output by the driving signal output circuit.

In the aspect of the liquid discharge apparatus, the driving frequency of the first transistor may be 1 MHz or more and 4 MHz or less.

According to the liquid discharge apparatus, the driving frequency of the first transistor of driving signal output circuit is 1 MHz or more and 4 MHz or less, such that it is possible to further reduce power consumption and heat generation caused by the driving signal output circuit while improving the waveform accuracy of the driving signal output by the driving signal output circuit.

In the aspect of the liquid discharge apparatus, the discharge head may be a line head capable of discharging a liquid to a medium of A4 size or more.

According to the liquid discharge apparatus, even when the discharge head includes many piezoelectric elements that are driven by the driving signal output by the driving signal output circuit, like the line head capable of discharging the liquid to the medium of A4 size or more, the possibility that the noise caused by the signal output to the coil from the coupling point where the second terminal of the first transistor and the sixth terminal of the second transistor are electrically coupled to each other affects various circuits of the driving signal output circuit is reduced. Therefore, the operation of the driving signal output circuit can be stabilized, and the waveform accuracy of the driving signal output by the driving signal output circuit can be improved.

In the aspect of the liquid discharge apparatus, the discharge head may include 5000 or more of the piezoelectric elements, and the driving signal output circuit may supply the driving signal to the 5000 or more piezoelectric elements.

According to the liquid discharge apparatus, even when the discharge head includes 5000 or more piezoelectric elements that are driven by the driving signal output by the driving signal output circuit, the possibility that the noise caused by the signal output to the coil from the coupling point where the second terminal of the first transistor and the sixth terminal of the second transistor are electrically coupled to each other affects various circuits of the driving signal output circuit is reduced. Therefore, the operation of the driving signal output circuit can be stabilized, and the waveform accuracy of the driving signal output by the driving signal output circuit can be improved.

In the aspect of the liquid discharge apparatus, The first terminal may be located at a corner of the first transistor.

In the aspect of the liquid discharge apparatus, the shortest distance between the third terminal and the coil may be longer than that between the sixth terminal and the coil.

In the aspect of the liquid discharge apparatus, the second terminal and the sixth terminal may be located to face each other, and the first transistor and the second transistor may be located so that the first terminal, the third terminal, the fourth terminal, and the fifth terminal are not located between the second terminal and the sixth terminal.

In the aspect of the liquid discharge apparatus, the first transistor may include a first side and a second side different from the first side, the first terminal and the second terminal may be located side by side along the first side, and the third terminal may be located along the second side.

In the aspect of the liquid discharge apparatus, an area of a first contact portion where the first terminal is in contact with the substrate is smaller than that of a second contact portion where the second terminal is in contact with the substrate, the area of the second contact portion where the second terminal is in contact with the substrate may be smaller than that of a third contact portion where the third terminal is in contact with the substrate.

According to the liquid discharge apparatus, in the first transistor, the area of the first contact portion where the first terminal is in contact with the substrate is smaller than the area of the second contact portion where the second terminal is in contact with the substrate and the area of the third contact portion where the third terminal is in contact with the substrate, such that it is possible to reduce a contact resistance between the second terminal and the substrate and a contact resistance between the third terminal and the substrate. As a result, heat generated in the first transistor can be reduced when the first control signal input to the first terminal controls a state in which the second terminal and the third terminal are electrically coupled to each other. As a result, the possibility that characteristics of the electronic components included in the driving signal output circuit change is reduced due to the heat generated in the first transistor, and as a result, the operation of the driving signal output circuit is further stabilized, and the waveform accuracy of the driving signal output by the driving signal output circuit is further improved.

What is claimed is:

1. A liquid discharge apparatus comprising:

a discharge head that includes a piezoelectric element and discharges a liquid by driving the piezoelectric element; and a driving signal output circuit that outputs a driving signal for driving the piezoelectric element, wherein the driving signal output circuit includes an integrated circuit that outputs a first control signal and a second control signal, a first transistor to which the first control signal is input, a second transistor to which the second control signal is input, a coil that has one end electrically coupled to the first transistor and the second transistor, and the other end electrically coupled to the discharge head, and a substrate, the integrated circuit, the first transistor, the second transistor, and the coil are provided on the substrate, the first transistor is a surface-mount type flat non-lead package, and in the first transistor, change in whether or not a second terminal and a third terminal are electrically coupled to each other is made according to the first control signal input to a first terminal, the second transistor is a surface-mount type flat non-lead package, and in the second transistor, change in whether or not a fifth terminal and a sixth terminal are electrically coupled to each other is made according to the second control signal input to a fourth terminal, the coil is electrically coupled to the second terminal and the sixth terminal, a shortest distance between the second terminal and the one end of the coil is shorter than that between the third terminal and the one end of the coil, and a shortest distance between the sixth terminal and the one end of the coil is shorter than that between the fifth terminal and the one end of the coil.

2. The liquid discharge apparatus according to claim 1, wherein the driving signal output circuit includes a class D amplifier circuit, the first transistor and the second transistor constitute a digital amplification section that amplifies a digital signal before demodulation, and the coil constitutes a low pass filter that demodulates output of the digital amplification section and outputs the driving signal.

3. The liquid discharge apparatus according to claim 1, wherein a driving frequency of the first transistor is 1 MHz or more and 8 MHz or less.

4. The liquid discharge apparatus according to claim 3, wherein the driving frequency of the first transistor is 1 MHz or more and 4 MHz or less.

5. The liquid discharge apparatus according to claim 1, wherein the discharge head is a line head configured to discharge a liquid to a medium of A4 size or more.

6. The liquid discharge apparatus according to claim 1, wherein the discharge head includes 5000 or more piezoelectric elements, and the driving signal output circuit supplies the driving signal to the 5000 or more piezoelectric elements.

7. The liquid discharge apparatus according to claim 1, wherein the first terminal is located at a corner of the first transistor.

8. The liquid discharge apparatus according to claim 1, wherein the shortest distance between the third terminal and the coil is longer than that between the sixth terminal and the coil.

9. The liquid discharge apparatus according to claim 1, wherein the second terminal and the sixth terminal are located to face each other, and the first transistor and the second transistor are located so that the first terminal, the third terminal, the fourth terminal, and the fifth terminal are not located between the second terminal and the sixth terminal.

10. The liquid discharge apparatus according to claim 1, wherein the first transistor includes a first side and a second side different from the first side, the first terminal and the second terminal are located side by side along the first side, and the third terminal is located along the second side.

11. The liquid discharge apparatus according to claim 1, wherein an area of a first contact portion where the first terminal is in contact with the substrate is smaller than that of a second contact portion where the second terminal is in contact with the substrate, and the area of the second contact portion where the second terminal is in contact with the substrate is smaller than that of a third contact portion where the third terminal is in contact with the substrate.

* * * * *